US012647359B2

(12) United States Patent
Dong et al.

(10) Patent No.: US 12,647,359 B2
(45) Date of Patent: Jun. 2, 2026

(54) MEDIA AWARE RTP PACKET DROPPING

(71) Applicant: Huawei Technologies Co., Ltd., Guangdong (CN)

(72) Inventors: Lijun Dong, San Diego, CA (US); Renwei Li, Sunnyvale, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 111 days.

(21) Appl. No.: 18/814,288

(22) Filed: Aug. 23, 2024

(65) Prior Publication Data

US 2024/0422098 A1      Dec. 19, 2024

Related U.S. Application Data

(63) Continuation of application No. PCT/US2022/078361, filed on Oct. 19, 2022.

(Continued)

(51) Int. Cl.
| | |
|---|---|
| *H04L 65/65* | (2022.01) |
| *H04L 45/74* | (2022.01) |
| *H04L 47/32* | (2022.01) |

(52) U.S. Cl.
CPC .............. *H04L 45/74* (2013.01); *H04L 47/32* (2013.01); *H04L 65/65* (2022.05)

(58) Field of Classification Search
CPC ......... H04L 45/74; H04L 47/32; H04L 65/65; H04L 45/302; H04L 47/24; H04L 45/566

(Continued)

(56) References Cited

U.S. PATENT DOCUMENTS

| | | | | |
|---|---|---|---|---|
| 11,652,828 B1 * | 5/2023 | Fricano | ............ | G06Q 10/06398 |
| | | | | 726/23 |
| 11,729,813 B1 * | 8/2023 | Li | ..................... | H04W 72/1263 |
| | | | | 370/329 |

(Continued)

FOREIGN PATENT DOCUMENTS

| | | | | | |
|---|---|---|---|---|---|
| CN | 1874321 B | * | 12/2010 | ............ | H04L 47/10 |
| WO | WO-2007035151 A1 | | 3/2007 | | |

(Continued)

OTHER PUBLICATIONS

"International Application Serial No. PCT/US2022/078361, International Search Report mailed Feb. 7, 2023", 5 pgs.

(Continued)

*Primary Examiner* — Khanh Q Dinh
(74) *Attorney, Agent, or Firm* — Schwegman Lundberg & Woessner, P.A.

(57)      ABSTRACT

A computer-implemented method for video data communication in a network includes receiving, by a node in the network, an Internet protocol (IP) data packet. The IP data packet includes an IP network layer header and an IP network layer payload. The IP network layer payload is parsed, by the node, to detect a Network Abstraction Layer Unit (NALU). The NALU includes a NALU header and a NALU payload. Priority information in the NALU header is detected by the node. The priority information indicates a transport priority of the NALU. A differentiated services (DS) field in the IP network layer header is updated based on the transport priority to generate an updated IP data packet. The updated IP data packet is forwarded to a second node in the network for discarding or processing based on the updated DS field.

20 Claims, 20 Drawing Sheets

Related U.S. Application Data

(60) Provisional application No. 63/313,827, filed on Feb. 25, 2022.

(58) Field of Classification Search
USPC ......................................... 709/220, 224–228
See application file for complete search history.

(56) References Cited

U.S. PATENT DOCUMENTS

| | | | |
|---|---|---|---|
| 2008/0095246 A1* | 4/2008 | Luo ........................ | H04N 19/61 |
| | | | 375/E7.173 |
| 2009/0028142 A1* | 1/2009 | Schmidt ............. | H04N 21/6437 |
| | | | 370/389 |
| 2009/0204805 A1* | 8/2009 | Robba ................ | H04L 63/0485 |
| | | | 713/153 |
| 2015/0244804 A1* | 8/2015 | Warfield ............. | H04L 49/9078 |
| | | | 709/219 |
| 2020/0107169 A1* | 4/2020 | Chin ................... | H04L 61/5038 |
| 2020/0167169 A1* | 5/2020 | Clemens ............... | G06F 9/4411 |
| 2021/0051175 A1* | 2/2021 | Lyle ........................ | H04L 45/38 |
| 2025/0016337 A1* | 1/2025 | Kammachi Sreedhar ................... | |
| | | | H04N 19/30 |

FOREIGN PATENT DOCUMENTS

| | | |
|---|---|---|
| WO | WO-2020210780 A1 | 10/2020 |
| WO | WO-2023163802 A1 | 8/2023 |

OTHER PUBLICATIONS

"International Application Serial No. PCT/US2022/078361, Written Opinion mailed Feb. 7, 2023", 10 pgs.

Dong, Lijun, et al., "New IP Enabled In-Band Signaling for Accurate Latency Guarantee Service", 7 pgs.

Lazar, G, et al., "Framework for IPTV QoS", Elmar, 50th International Symposium, IEEE, Piscataway, NJ, USA (Sep. 10, 2008), 4 pgs.

Li, Richard, et al., "Qualitative Communication for Emerging Network Applications with New IP", 10 pgs.

* cited by examiner

300
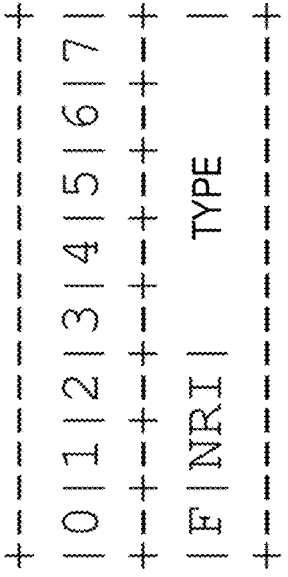
FIG. 3

400

| NAL UNIT TYPE | CONTENT OF NAL UNIT | NRI (BINARY) |
|---|---|---|
| 1 | NON-IDR CODED SLICE | 10 |
| 2 | CODED SLICE DATA PARTITION A | 10 |
| 3 | CODED SLICE DATA PARTITION B | 01 |
| 4 | CODED SLICE DATA PARTITION C | 01 |

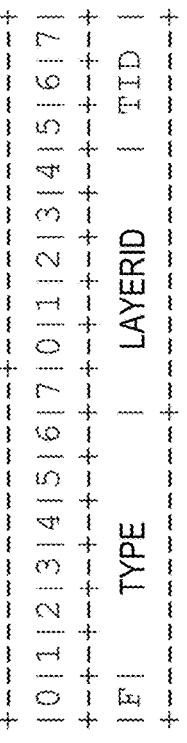
FIG. 5

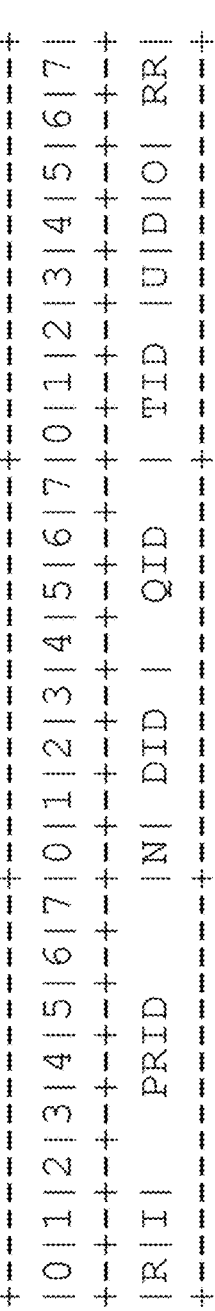
FIG. 6

700

| 0 | 1 | 2 | 3 | 4 | 5 | 6 | 7 | 0 | 1 | 2 | 3 | 4 | 5 | 6 | 7 |
|---|---|---|---|---|---|---|---|---|---|---|---|---|---|---|---|
| F | Z | | LayerID | | | | | | Type | | | | TID | | |

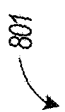
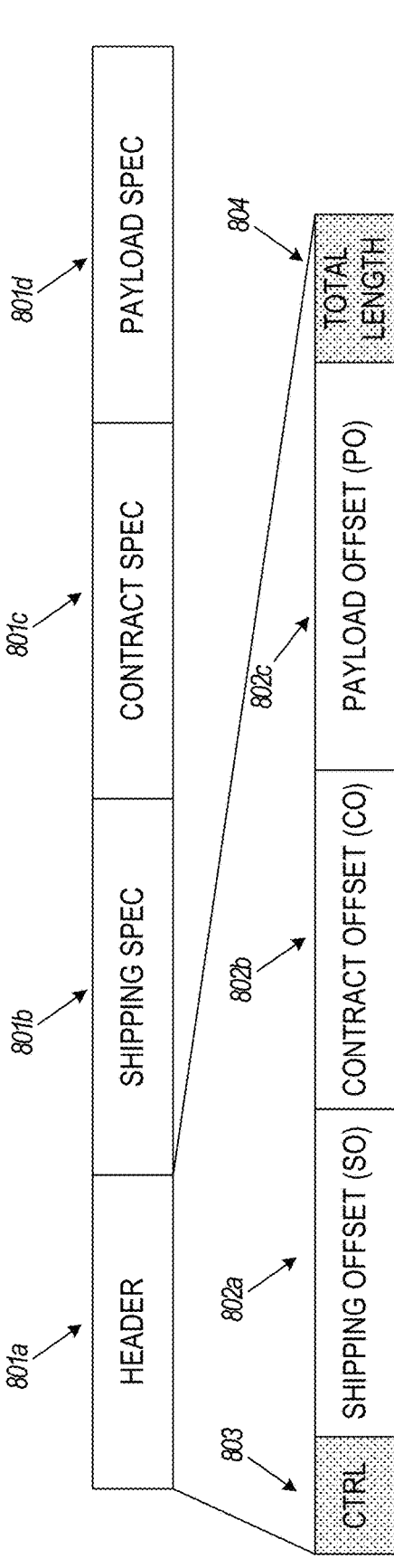
FIG. 8

1100

<Contract> := <Contract clause>
   | <Contract clause> AND <Contract>

<Contract clause> := <Contract ECA>
   | <Contract ECA> OR <Contract clause>

<Contract ECA> := <Event, Condition, Action>
   | <Event, Condition, Action> <Metadata>
   | <Action>
   | <Action><Metadata>

1200

```
<Action> := <BoundedLatency>
       | <OnTimeDelivery> | <Coordinate>
       | <NoPktLoss> | <PktMonitor>
       | <ReportInsuringParty>
       | [...]
```

```
<Event> := [<Queue Levels> | <Path Outage>
    | <Pkt Late> |  <Pkt Drop>
    | <NoPktLoss> | <PktMonitor>
    | <NextHop> | <Pkt Count>
    | ...| <none>]

<Condition> :=[<equals> | <LE> | <GE>
    | ...| <none>]
```

1500

| NRI Value | Interactive Video | Non-Interactive Video |
|---|---|---|
| 11 | AF41 | AF42 |
| 10 | AF42 | AF43 |
| 01 | AF31 | AF32 |
| 00 | AF32 | AF33 |

| TID Value | Interactive Video | Non-Interactive Video |
|---|---|---|
| 001 | AF41 | AF42 |
| 010 | AF42 | AF43 |
| 011 | AF31 | AF32 |
| 100 | AF32 | AF33 |
| 101 | AF21 | AF22 |
| 110 | AF22 | AF23 |
| 111 | AF11 | AF12 |

1700

| HEADERS | CHUNK1 | CHUNK2 | CHUNK3 | CHUNK4 | CHUNK5 |

| HEADERS | CHUNK1 |

| HEADERS | CHUNK2 |

| HEADERS | CHUNK3 |

| HEADERS | CHUNK4 |

| HEADERS | CHUNK5 |

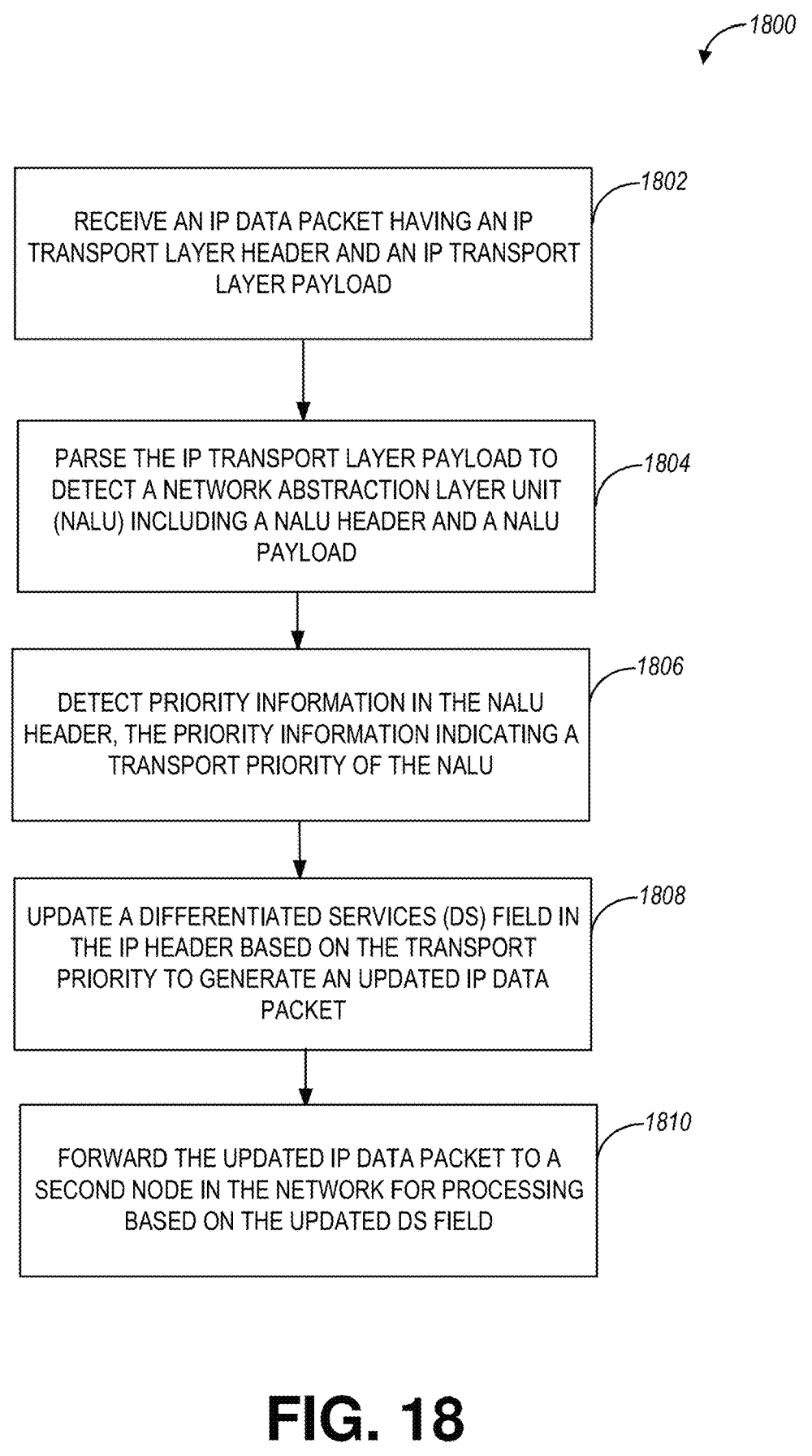

*1800*

RECEIVE AN IP DATA PACKET HAVING AN IP TRANSPORT LAYER HEADER AND AN IP TRANSPORT LAYER PAYLOAD —1802

PARSE THE IP TRANSPORT LAYER PAYLOAD TO DETECT A NETWORK ABSTRACTION LAYER UNIT (NALU) INCLUDING A NALU HEADER AND A NALU PAYLOAD —1804

DETECT PRIORITY INFORMATION IN THE NALU HEADER, THE PRIORITY INFORMATION INDICATING A TRANSPORT PRIORITY OF THE NALU —1806

UPDATE A DIFFERENTIATED SERVICES (DS) FIELD IN THE IP HEADER BASED ON THE TRANSPORT PRIORITY TO GENERATE AN UPDATED IP DATA PACKET —1808

FORWARD THE UPDATED IP DATA PACKET TO A SECOND NODE IN THE NETWORK FOR PROCESSING BASED ON THE UPDATED DS FIELD —1810

FIG. 18

MEDIA AWARE RTP PACKET DROPPING

CROSS REFERENCE TO RELATED APPLICATION

This application is a continuation of International Application Serial Number PCT/US2022/078361, filed Oct. 19, 2022, which claims priority to U.S. Provisional Application Ser. No. 63/313,827, filed Feb. 25, 2022, the benefit of priority of each of which are claimed herein, and which applications are incorporated herein by reference in their entirety.

TECHNICAL FIELD

The present disclosure is related to data transmission in a network including media aware Real-Time Transport Protocol (RTP) packet dropping.

BACKGROUND

For packet-based network architectures, a data packet is the fundamental unit upon which different actions such as classification, forwarding, or discarding are performed by network nodes in the network. The Internet Protocol (IP), the principal communication protocol used by the Internet, has a data packet format with a fixed size IP header that carries address and control information, followed by a payload. Such data packet formats are suitable for best-effort forwarding for applications that involve the exchange of data for human consumption (e.g., websites, multimedia, human-driven machine operators, etc.). However, the fixed header format may result in transmission overheads when the control information is small and can be limiting when information required by a desired network service cannot fit into the header. Additionally, network congestion associated with the communication flow of IP packets can be associated with indiscriminate dropping (or discarding) of packets, which can cause data processing inefficiencies.

SUMMARY

Various examples are now described to introduce a selection of concepts in a simplified form that is further described below in the detailed description. The Summary is not intended to identify key or essential features of the claimed subject matter, nor is it intended to be used to limit the scope of the claimed subject matter.

According to a first aspect of the present disclosure, there is provided a computer-implemented method for video data communication in a network. The method includes receiving, by a node in the network, an Internet protocol (IP) data packet. The IP data packet includes an IP network layer header and an IP network layer payload. The method further includes parsing the IP network layer payload, by the node, to detect a Network Abstraction Layer Unit (NALU). The NALU includes a NALU header and a NALU payload. The method further includes detecting, by the node, priority information in the NALU header. The priority information indicates a transport priority of the NALU. The method further includes updating, by the node, a differentiated services (DS) field in the IP network layer header based on the transport priority to generate an updated IP data packet. The method further includes forwarding, by the node, the updated IP data packet to a second node in the network for discarding or processing based on the updated DS field.

In a first implementation form of the method according to the first aspect as such, the method further includes mapping the priority information to a differentiated services code point (DSCP) value using a mapping table.

In a second implementation form of the method according to the first aspect as such or any preceding implementation form of the first aspect, the method further includes updating the DS field in the IP network layer header using the DSCP value.

In a third implementation form of the method according to the first aspect as such or any preceding implementation form of the first aspect, the method further includes decoding a second IP data packet received by the node, the second IP data packet comprising a data packet.

In a fourth implementation form of the method according to the first aspect as such or any preceding implementation form of the first aspect, the method further includes parsing the data packet to determine a contract clause, the contract clause comprising a metadata field storing metadata information.

In a fifth implementation form of the method according to the first aspect as such or any preceding implementation form of the first aspect, the method further includes determining transport priority associated with the data packet based on the metadata information.

In a sixth implementation form of the method according to the first aspect as such or any preceding implementation form of the first aspect, the method further includes performing one of discarding the IP data packet or forwarding the IP data packet and the data packet to another node in the network based on the transport priority.

In a seventh implementation form of the method according to the first aspect as such or any preceding implementation form of the first aspect, the method further includes decoding a second IP data packet, the second IP data packet having a second IP network layer header and a second IP network layer payload. The method further includes parsing the second IP data packet to detect the second IP network layer header comprises an extension header. The method further includes parsing the extension header to detect second priority information associated with the second IP data packet. The method further includes performing one of discarding the second IP data packet or forwarding the second IP data packet to the second node in the network based on the second priority information.

In an eighth implementation form of the method according to the first aspect as such or any preceding implementation form of the first aspect, the method further includes decoding a second IP data packet, the second IP data packet having a second IP network layer header and a second IP network layer payload. The method further includes parsing the second IP data packet to detect the second IP network layer header comprises an IPv4 header. The method further includes parsing the IPv4 header to detect second priority information stored in an options field, the second priority information associated with the second IP data packet. The method further includes performing one of discarding the second IP data packet or forwarding the second IP data packet to the second node in the network based on the second priority information.

In a ninth implementation form of the method according to the first aspect as such or any preceding implementation form of the first aspect, the method further includes parsing the IP data packet to detect a network instruction, determining the network instruction is an instruction for header inspection, and inspecting the NALU header to detect the priority information, the inspecting based on the instruction for the header inspection.

According to a second aspect of the present disclosure, there is provided a node for communicating data in a network includes a memory that stores instructions and at least one processor in communication with the memory. The at least one processor is configured, upon execution of the instructions, to perform operations including receiving an Internet protocol (IP) data packet. The IP data packet having an IP network layer header and an IP network layer payload. The operations further include parsing the IP network layer payload to detect a Network Abstraction Layer Unit (NALU). The NALU includes a NALU header and a NALU payload. The operations further include detecting priority information in the NALU header, the priority information indicating a transport priority of the NALU. The operations further include updating a differentiated services (DS) field in the IP network layer header based on the transport priority to generate an updated IP data packet. The operations further include forwarding the updated IP data packet to a second node in the network for discarding or processing based on the updated DS field.

In a first implementation form of the node according to the second aspect as such, the operations further include mapping the priority information to a differentiated services code point (DSCP) value using a mapping table.

In a second implementation form of the node according to the second aspect as such or any preceding implementation form of the second aspect, the operations further include updating the DS field in the IP network layer header using the DSCP value.

In a third implementation form of the node according to the second aspect as such or any preceding implementation form of the second aspect, the operations further include decoding a second IP data packet received by the node, the second IP data packet comprising a data packet.

In a fourth implementation form of the node according to the second aspect as such or any preceding implementation form of the second aspect, the operations further include parsing the data packet to determine a contract clause, the contract clause comprising a metadata field storing metadata information.

In a fifth implementation form of the node according to the second aspect as such or any preceding implementation form of the second aspect, the operations further include determining transport priority associated with the data packet based on the metadata information.

In a sixth implementation form of the node according to the second aspect as such or any preceding implementation form of the second aspect, the operations further include performing one of discarding the IP data packet or forwarding the IP data packet and the data packet to another node in the network based on the transport priority.

In a seventh implementation form of the node according to the second aspect as such or any preceding implementation form of the second aspect, the operations further include decoding a second IP data packet, the second IP data packet having a second IP network layer header and a second IP network layer payload. The operations further include parsing the second IP data packet to detect the second IP network layer header comprises an extension header. The operations further include parsing the extension header to detect second priority information associated with the second IP data packet. The operations further include performing one of discarding the second IP data packet or forwarding the second IP data packet to the second node in the network based on the second priority information.

In an eighth implementation form of the node according to the second aspect as such or any preceding implementation form of the second aspect, the operations further include decoding a second IP data packet, the second IP data packet having a second IP network layer header and a second IP network layer payload. The operations further include parsing the second IP data packet to detect the second IP network layer header comprises an IPv4 header. The operations further include parsing the IPv4 header to detect second priority information stored in an options field, the second priority information associated with the second IP data packet. The operations further include performing one of discarding the second IP data packet or forwarding the second IP data packet to the second node in the network based on the second priority information.

In a ninth implementation form of the node according to the second aspect as such or any preceding implementation form of the second aspect, the operations further include parsing the IP data packet to detect a network instruction. The operations further include determining the network instruction is an instruction for header inspection. The operations further include inspecting the NALU header to detect the priority information, the inspecting based on the instruction for the header inspection.

According to a third aspect of the present disclosure, there is provided a non-transitory computer-readable medium storing instructions for communicating data in a network, that when executed by one or more processors of a node, cause the one or more processors to perform operations. The operations include receiving an Internet protocol (IP) data packet. The IP data packet having an IP network layer header and an IP network layer payload. The operations further include parsing the IP network layer payload to detect a Network Abstraction Layer Unit (NALU). The NALU includes a NALU header and a NALU payload. The operations further include detecting priority information in the NALU header. The priority information indicates a transport priority of the NALU. The operations further include updating a differentiated services (DS) field in the IP network layer header based on the transport priority to generate an updated IP data packet. The operations further include forwarding the updated IP data packet to a second node in the network for discarding or processing based on the updated DS field.

In a first implementation form of the non-transitory computer-readable medium according to the third aspect as such, the operations further include mapping the priority information to a differentiated services code point (DSCP) value using a mapping table.

In a second implementation form of the non-transitory computer-readable medium according to the third aspect as such or any preceding implementation form of the third aspect, the operations further include updating the DS field in the IP network layer header using the DSCP value.

In a third implementation form of the non-transitory computer-readable medium according to the third aspect as such or any preceding implementation form of the third aspect, the operations further include decoding a second IP data packet received by the node, the second IP data packet comprising a data packet.

In a fourth implementation form of the non-transitory computer-readable medium according to the third aspect as such or any preceding implementation form of the third aspect, the operations further include parsing the data packet to determine a contract clause. The contract clause includes a metadata field storing metadata information.

In a fifth implementation form of the non-transitory computer-readable medium according to the third aspect as such or any preceding implementation form of the third aspect, the operations further include determining transport priority associated with the data packet based on the metadata information.

In a sixth implementation form of the non-transitory computer-readable medium according to the third aspect as such or any preceding implementation form of the third aspect, the operations further include performing one of discarding the IP data packet or forwarding the IP data packet and the data packet to another node in the network based on the transport priority.

In a seventh implementation form of the non-transitory computer-readable medium according to the third aspect as such or any preceding implementation form of the third aspect, the operations further include decoding a second IP data packet. The second IP data packet includes a second IP network layer header and a second IP network layer payload. The operations further include parsing the second IP data packet to detect the second IP network layer header comprises an extension header. The operations further include parsing the extension header to detect second priority information associated with the second IP data packet. The operations further include performing one of discarding the second IP data packet or forwarding the second IP data packet to the second node in the network based on the second priority information.

In an eighth implementation form of the non-transitory computer-readable medium according to the third aspect as such or any preceding implementation form of the third aspect, the operations further include decoding a second IP data packet. The second IP data packet includes a second IP network layer header and a second IP network layer payload. The operations further include parsing the second IP data packet to detect the second IP network layer header comprises an IPv4 header. The operations further include parsing the IPv4 header to detect second priority information stored in an options field, the second priority information associated with the second IP data packet. The operations further include performing one of discarding the second IP data packet or forwarding the second IP data packet to the second node in the network based on the second priority information.

In a ninth implementation form of the non-transitory computer-readable medium according to the third aspect as such or any preceding implementation form of the third aspect, the operations further include parsing the IP data packet to detect a network instruction. The operations further include determining the network instruction is an instruction for header inspection. The operations further include inspecting the NALU header to detect the priority information, the inspecting based on the instruction for the header inspection.

According to a fourth aspect of the present disclosure, there is provided a system for video data communication in a network. The system includes: means for receiving an Internet protocol (IP) data packet, the IP data packet having an IP network layer header and an IP network layer payload; means for parsing the IP network layer payload to detect a Network Abstraction Layer Unit (NALU), the NALU comprising a NALU header and a NALU payload; means for detecting priority information in the NALU header, the priority information indicating a transport priority of the NALU; means for updating a differentiated services (DS)

field in the IP network layer header based on the transport priority to generate an updated IP data packet; and means for forwarding the updated IP data packet to a second node in the network for discarding or processing based on the updated DS field.

Anyone of the foregoing examples may be combined with any one or more of the other foregoing examples to create a new embodiment within the scope of the present disclosure.

BRIEF DESCRIPTION OF THE DRAWINGS

In the drawings, which are not necessarily drawn to scale, like numerals may describe similar components in different views. The drawings illustrate generally, by way of example, but not by way of limitation, various embodiments discussed in the present document.

FIG. 3 is a diagram of a H.264 network abstraction layer unit (NALU) header, which can be used in connection with some example embodiments.

FIG. 5 is a diagram of a H.265 NALU header, which can be used in connection with some example embodiments.

FIG. 6 is a diagram of a scalable video coding (SVC) NALU header, which can be used in connection with some example embodiments.

FIG. 8 illustrates a New IP header and data format which can be used in the network architecture of FIG. 1 in connection with some example embodiments.

FIG. 12 illustrates an example of actions that may be specified in a contract clause, which can be used in connection with some example embodiments.

FIG. 18 is a flowchart of a method suitable for data packet communication and processing, according to some example embodiments.

DETAILED DESCRIPTION

Figure 1:
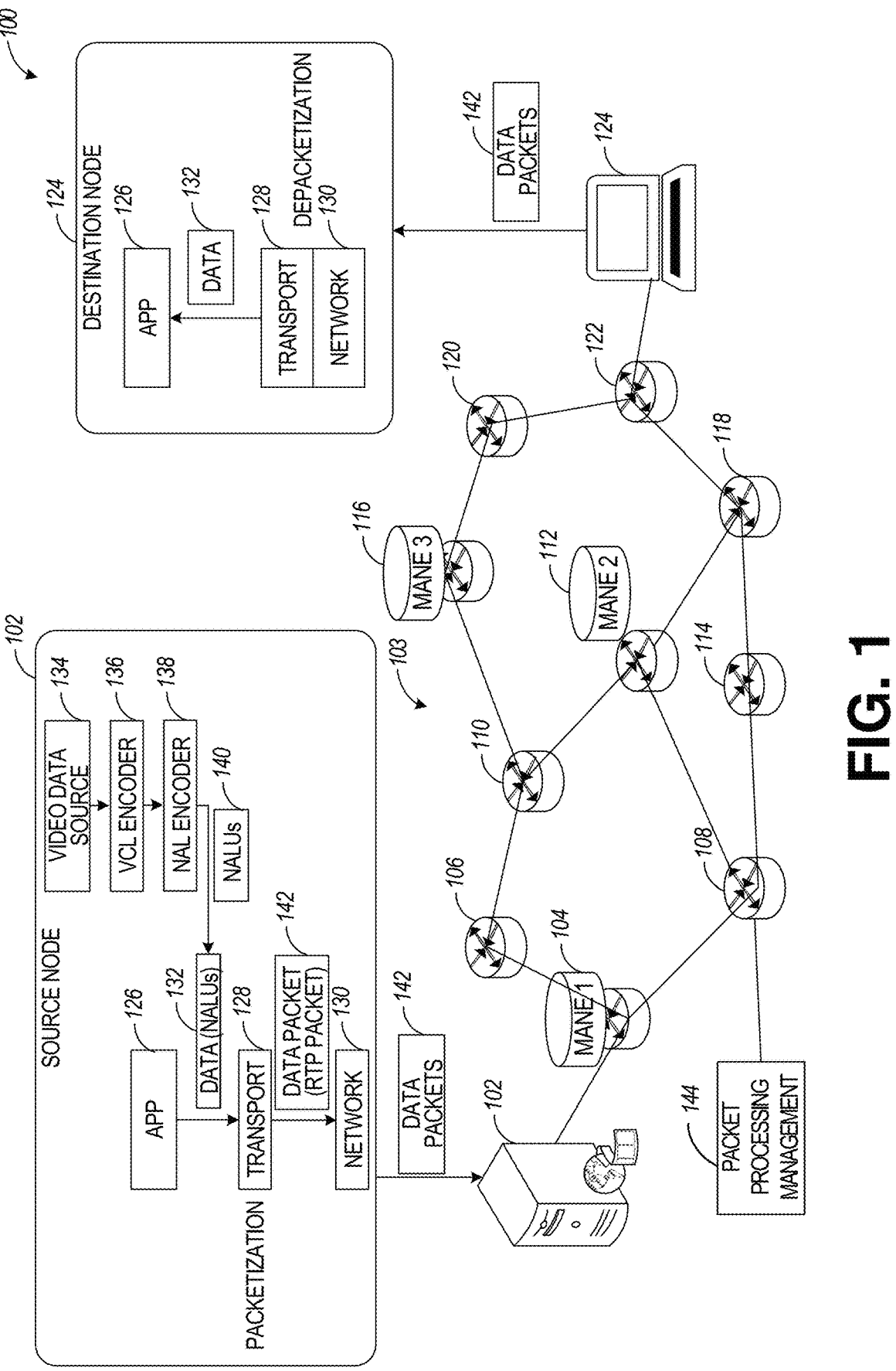
FIG. 1 is a high-level system overview of a network architecture with a packet processing management module, according to some example embodiments.

It should be understood at the outset that although an illustrative implementation of one or more embodiments is provided below, the disclosed systems and/or methods described with respect to FIGS. 1-20 may be implemented using any number of techniques, whether currently known or not yet in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In the following description, reference is made to the accompanying drawings that form a part hereof, and in which are shown, by way of illustration, specific embodiments which may be practiced. These embodiments are described in sufficient detail to enable those skilled in the art to practice the inventive subject matter, and it is to be understood that other embodiments may be utilized, and that structural, logical, and electrical changes may be made without departing from the scope of the present disclosure. The following description of example embodiments is, therefore, not to be taken in a limiting sense, and the scope of the present disclosure is defined by the appended claims.

As used herein, the term "network-based service infrastructure" includes a plurality of network devices (also referred to as hosts, nodes, or servers) providing on-demand computing capacity (e.g., via one or more virtual machines or other virtual resources running on the network devices) and storage capacity as a service to a community of end-recipients (e.g., customers of the service infrastructure) where the end recipients are communicatively coupled to the network devices within the service infrastructure via a network. The customers of the service infrastructure can use one or more computing devices (or customer devices) to access and manage the services (e.g., workload scheduling services) provided by the service infrastructure via the network. The customer devices, the network, and the network-based service infrastructure can be collectively referred to as a "network architecture." The customers of the service infrastructure can also be referred to as "users." As used herein, the term "processing" in connection with a packet (e.g., packet processing) includes determining (e.g., using the disclosed techniques) whether a packet can be dropped (or discarded).

As used herein, the terms "IP data packet" and "IP packet" are used to indicate a type of a network layer packet associated with the Network Layer of the Open Systems Interconnection model (OSI model). In this regard, the functionalities described herein associated with IP data packets are also applicable to other types of packets, including other types of Network Layer packets.

The modern video codecs (e.g., Advanced Video Coding (AVC) or H.264, Scalable Video Coding (SVC), High Efficiency Video Coding (HEVC) or H.265, and Versatile Video Coding (VVC) or H.266) can be configured to use the Network Abstraction Layer (NAL) unit (NALU)-based syntax structure. The NALU-based syntax structure can be used for providing packetization/framing of video data to be transmitted in packet-based systems using Internet transport protocols such as RTP. In some aspects, the transport layer can identify the boundaries among adjacent NAL units without use of start code, which results in reducing the overhead for these start codes. Depending on the characteristics of the NAL unit(s) encapsulated in a RTP packet, the priority/importance of RTP packets from the same video streaming flow could differ from each other. In some embodiments, the disclosed techniques can be used to configure priority information carried in RTP packets for H.264/AVC, SVC, H.265/HEVC, and H.266/VVC data streams (e.g., as described in connection with FIGS. 1-7), and determine whether to discard (drop) packets or process packets based on the priority information. In some embodiments, data packets can be utilized with the disclosed techniques (e.g., as discussed in connection with FIGS. 8-14). The disclosed techniques can also be used to configure the network layer to be aware of and utilize such priority information for selective packet dropping when network congestion happens and outgoing buffer overflows (e.g., as discussed in connection with FIG. 15 and FIG. 16).

FIG. 1 is a high-level system overview of a network architecture 100 with a packet processing management module, according to some example embodiments. The network architecture 100 includes, for example, a source node 102, a destination node 124, and a communication network 103. The communication network 103 includes communication nodes 104, 106, 108, 110, 112, 114, 116, 118, 120, and 122.

At least one of the communication nodes (e.g., nodes 104, 112, and 116) can be a media aware network element (MANE). In some embodiments, a MANE is a network element, such as a middlebox or an application layer gateway, that is capable of parsing certain aspects of RTP payload headers or the RTP payload and reacting to the parsed content. In some aspects, the concept of a MANE goes beyond normal routers or gateways in that a MANE has to be aware of the signaling (e.g., to learn about the payload type mappings of the media streams) and that it has to be trusted when working with Secure Real-time Transport Protocol (SRTP). In some aspects, the advantage of using MANEs in the network architecture 100 is that they allow packets to be dropped according to the needs of the media coding. For example, if a MANE has to drop packets due to congestion, the MANE can identify and remove those packets whose elimination produces the least adverse effect on the user experience (e.g., such packet discarding can be based on priority information in a NALU header encapsulated within an IP transport packet such as RTP packet). In some embodiments, end-to-end security with either authentication, integrity, or confidentiality protection can be used to prevent a MANE from performing media-aware operations other than discarding complete packets. In the case of confidentiality protection, the MANE can be prevented from discarding packets in a media-aware way. To be allowed to perform its operations, a MANE can be configured as a trusted entity that is included in the security context establishment of the network architecture 100.

Even though the communication network 103 is illustrated to include three MANEs (e.g., nodes 104, 112, and 116), the disclosure is not limited in this regard and a different number of MANEs can be used.

In some aspects, MANE functionalities can be used as an overlay approach. Although MANE can provide media-awareness and discard RTP packets (e.g., according to NRI for H.264 and SVC, or LayerID for H.265 as discussed herein), for a congested network node that does not include MANE functionalities, the packets are dropped without media-awareness. The disclosed techniques extend the MANE's media awareness to the routers, such that priority based dropping due to network congestion could be applied at routers without MANE.

Figure 15:
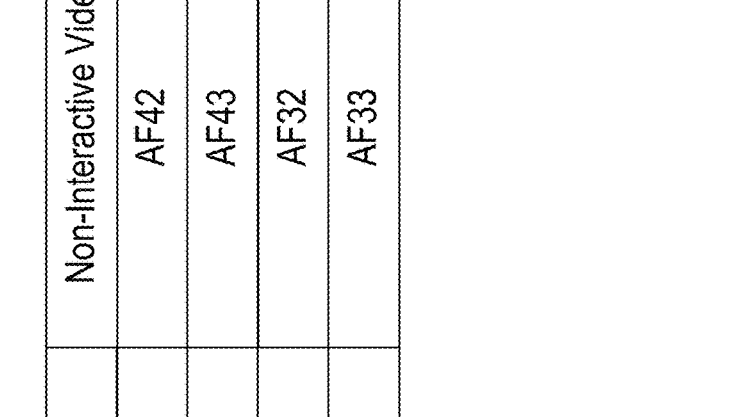
FIG. 15 illustrates a table of example differentiated services code point (DSCP) values for RTP packets according to nal_ref_idc (NRI) value and video type (with H.264 or SVC video encoder), in connection with some example embodiments.
Figure 16:
FIG. 16 illustrates a table of example DSCP values for RTP packets according to temporal ID (TID) value and video type (with H.265 or H.266 video encoder), in connection with some example embodiments.

In some embodiments, the disclosed techniques can use the following four configurations for determining whether a packet can be processed (e.g., forwarded or discarded) based on priority information:

(a) In some embodiments, MANE functionalities can be deployed on edge routers in a communication network. However, other routers in the communication network may not be configured with MANE functionalities (i.e., such routers or nodes are not MANE-capable) or with New IP functionalities (e.g., New IP functionalities are discussed in connection with FIGS. 9-13). Such other routers may not be able to access the NALU header to obtain the priority information of the packet. The MANE-capable node (e.g., edge router) can be configured to carry out DSCP mapping. More specifically, the MANE-capable edge router could obtain the priority information (e.g., from a NALU header), map the fields indicating the priority of the NALU encapsulated in the packet payload to DSCP values (e.g., using a mapping table such as illustrated in FIGS. 15-16), and include the DSCP value corresponding to the priority information in a DS field of the IP header. After this packet is communicated to the subsequent node, further processing of the packet (e.g., forwarding or discarding/dropping of the packet) can be evaluated based on the DSCP value from the IP header DS field. In this regard, the packet can be discarded based on the priority information from the NALU. In some embodiments, the granularity of the priority mapping to DSCP values can be limited by the number of bits in the DSCP filed (e.g., at most 6 bits), and some of the possible values have already been standardized and used for other purposes.

(b) In some embodiments, network nodes (e.g., routers) can be upgraded to have New IP functionalities (e.g., as discussed in connection with FIGS. 9-13). If a node is configured with New IP functionalities, the priority information can be deduced or copied from the header fields in the NALU. The priority information can then be inserted in the New IP metadata field (e.g., contract metadata field as illustrated in FIG. 10). In this case, the network node with New IP functionalities can obtain the NALU priority information from the metadata field and determine whether to discard the packet based on such priority information.

(c) In some embodiments, network nodes (e.g., routers) which are upgraded to have New IP functionalities can parse a contract specification field to obtain a contract clause specifying a command (or contract) allowing the router to inspect the upper layer payload (e.g., the NALU). The router can then obtain the priority information after inspection of the NALU header, and can use the obtained priority information for making a determination on whether the packet should be discarded.

(d) In some embodiments, network nodes (e.g., routers) can be configured with IPv6 or IPv4 functionalities. If the network node is IPv6-enabled, the priority information can be included in an IPV6 extension header. Additionally, if the network node is IPv4-enabled, the priority information of the NALU can be included in the options field of the IPv4 header. In this regard, IPv6 or Ipv4 enabled nodes can obtain the priority information from either an IPv6 extension header or an IPv4 header and use routers able to perceive this information, and use such priority information for making a determination on whether the packet should be discarded.

The source node 102 and the destination node 124 can be any type of electronic device capable of communicating over the communication network 103 such as, but not limited to, a mobile communication device, an Internet-of-things (IoT) device, a personal computer, a server, a router, a mainframe, a database, or any other type of user or a network device. For example, the source node 102 can be a media server, and the destination node 124 can be a mobile device that receives media content from the source node 102.

In the depicted embodiment, the source node 102 executes one or more programs/applications (APP) 126. The APP 126 can be any type of software application, which produces or otherwise generates data 132. Data 132 can be any type of data depending on the functions of the APP 126. For example, in one embodiment, the data 132 can be multi-media data (e.g., audio and/or video data) that is generated by the source node 102 and is pushed (or communicated) to the destination node 124 via the communication network 103 including communication nodes 104-122. Alternatively, data 132 can be data that is specifically requested from the source node 102 by the destination node 124.

In some embodiments, source node 102 includes a video data source 134 configured to generate video data, which is encoded by the video coding layer (VCL) encoder 136 and by the NAL encoder 138 to generate NALUs 140 encapsulating the encoded video data as payload. In some embodiments, NALUs 140 are processed as data 132.

For example, to communicate data 132 to the destination node 124, APP 126 on the source node 102 uses an application programming interface (API) to communicate the data 132 to a transport layer 128 of the source node 102. The transport layer 128 is responsible for delivering the data 132 to the appropriate APP 126 on the destination node 124. The transport layer 128 bundles/organizes the data into one or more data packets (e.g., data packets 142) according to a specific protocol (e.g., packetization or transport protocol such as RTP). For instance, the transport layer 128 may use various communication protocols such as, but not limited to, Transmission Control Protocol/Internet protocol (TCP/IP) or RTP for providing host-to-host communication services such as connection-oriented communication, reliability, flow control, and multiplexing.

The data packets 142 are transferred to a network layer 130 of the source node 102. The network layer 130 is responsible for packet forwarding including routing of the data packets 142 through one or more intermediate routers or network nodes 104-122 of the communication network 103. The communication network 103 can comprise multiple interconnected networks including, but not limited to, a local area network (LAN), a metropolitan area network (MAN), a wide area network (WAN), a wireless or a mobile network, and an inter-network (e.g., the Internet), or a combination thereof. When the data packets 142 reach the destination node 124, data 132 is extracted from the data packets 142 (e.g., during depacketization) and is passed to APP 126 on the destination node 124 for further processing.

Although FIG. 1 illustrates one example of a network architecture 100, various changes may be made to FIG. 1. For example, the network architecture 100 could include any number of source nodes, destination nodes, MANEs, non-MANE routers or nodes (e.g., nodes 106, 108, 110, 114, 118, 120, and 122), access points, networks, or other components in any suitable configuration.

In some embodiments, the network architecture 100 further includes a packet processing management (PPM) module 144 which can be configured at one or more of the nodes of the network architecture 100 (e.g., node 108). The PPM module 144 includes suitable circuitry, interfaces, and/or code and is configured to perform one or more of the packet processing functionalities discussed herein. For example, the PPM module can be used to configure priority information carried in RTP packets for H.264/AVC, SVC, H.265/HEVC, and H.266/VVC data streams (e.g., as described in connection with FIGS. 1-7), and determine whether to discard (drop) packets or process packets based on the priority information. In some embodiments, the PPM module can be used to configure data packets, which can be utilized in connection with packet processing (e.g., as discussed in connection with FIGS. 8-14). The PPM module can also be used to configure the network layer to be aware of and utilize such priority information for selective packet dropping when network congestion happens and outgoing buffer overflows.

Even though FIG. 1 illustrates a single PPM module 144 configured with node 108, the disclosure is not limited in this regard and the network architecture 100 can be configured with a different number of PPM modules (e.g., all nodes in the network architecture 100 can include such PPM module).

For a H.264, H.265, or an SVC video stream carried by RTP packets, all bitstream components can be encapsulated in NAL units. The NAL encoder (e.g., NAL encoder 138 of the source node 102) encapsulates the slice output of the VCL encoder (e.g., VCL encoder 136) into NALUs (e.g., NALUs 140), which are suitable for transmission over packet networks or for use in packet-oriented multiplex environments.

RTP

For different versions of video encoding schemes, the RTP packet payload format has been and is being standardized. RTP is a protocol dedicated to the transport of real-time video and audio streams. RTP streams are typically delivered using User Datagram Protocol (UDP), which is an unreliable transport mechanism as it does not use discarding priority or any guarantee of packet delivery. Within a video flow, the importance or discarding priority can differ among different RTP packets, depending on the NAL unit(s) encapsulated in the RTP packets. FIGS. 2-7 provide details regarding different techniques for configuring RTP packets and including priority information in NALU headers encapsulated in RTP packets.

Figure 2:
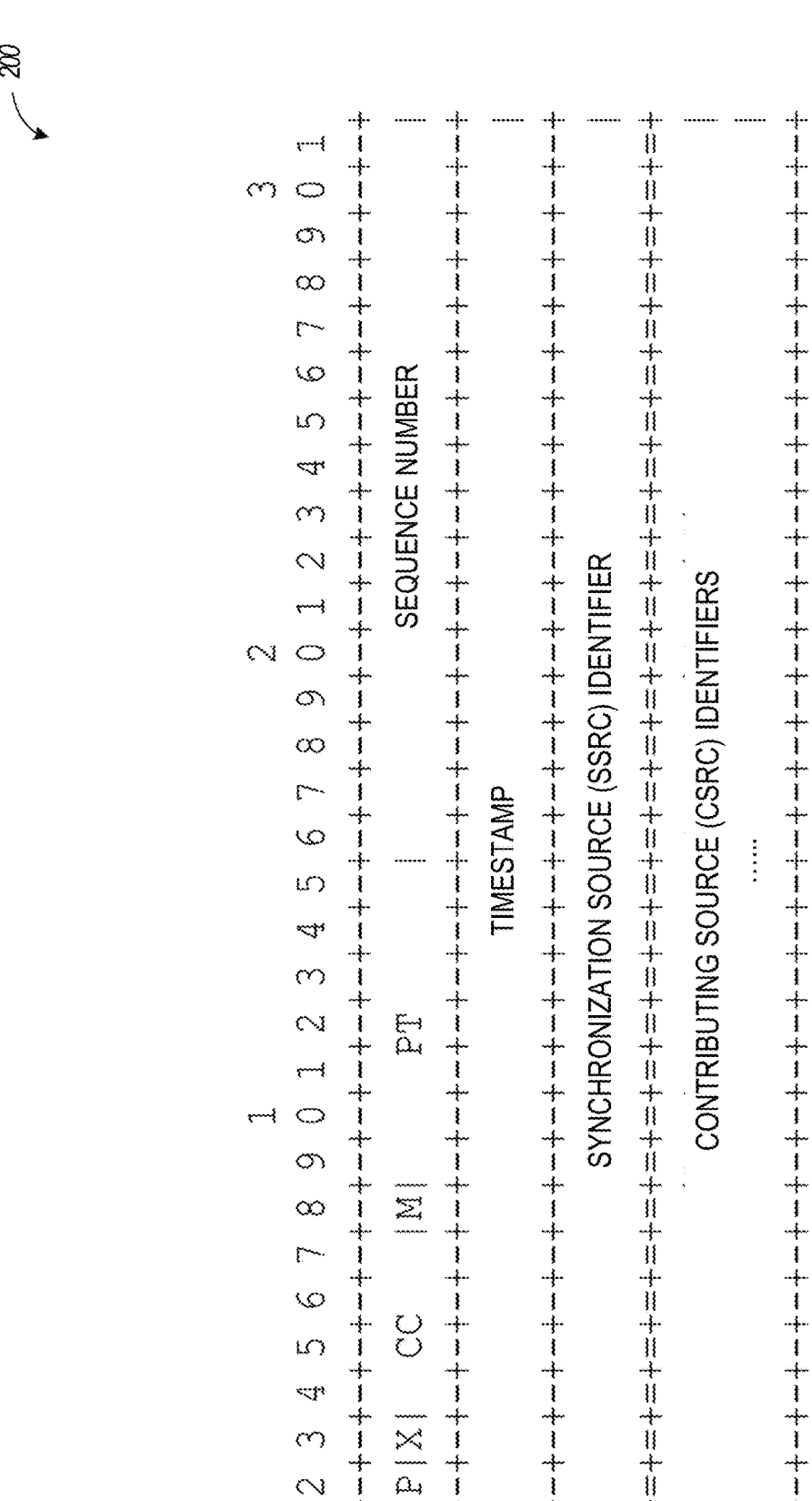
FIG. 2 is a diagram of a real-time transport protocol (RTP) header, which can be used in connection with some example embodiments.

FIG. 2 is a diagram of a real-time transport protocol (RTP) header 200, which can be used in connection with some example embodiments. As illustrated in FIG. 2, the RTP header 200 includes a marker bit (M), a packet type (PT) field, a sequence number (SN) field, and a timestamp field.

The marker bit can be set for the very last packet of the access unit indicated by the RTP timestamp, in line with the normal use of the M bit in video formats, to allow an efficient playout buffer handling. The SN field is 16 bits and can be set and used in accordance with RFC 3550. For the single NALU and non-interleaved packetization mode, the sequence number is used to determine decoding order for the NALU. The timestamp field is 32 bits and is set to the sampling timestamp of the content. In some aspects, a 90 kHz clock rate can be used.

NALUs

In some aspects, the video coding layer (VCL) encoder 136 contains the signal processing functionalities of the codec including transform, quantization, motion-compensated prediction, and filtering (e.g., via a loop filter). In some aspects, the VCL encoder 136 outputs slices, which include a bit string that contains the macroblock data of an integer number of macroblocks and the information of the slice header (containing the spatial address of the first macroblock in the slice, the initial quantization parameter, and similar information).

In some aspects, the NAL encoder 138 encapsulates the slice output of the VCL encoder 136 into NALUs, which are suitable for transmission over packet networks or for use in packet-oriented multiplex environments.

In some aspects, a NALU (e.g., from the NALUs 140) consists of a one-byte header and the payload byte string. The header indicates the type of the NALU, the (potential) presence of bit errors or syntax violations in the NAL unit payload, and information (e.g., priority information) regarding the relative importance of the NAL unit for the decoding process.

In some embodiments, the priority information associated with video data can be included in different fields of the NALU header (e.g., based on the encoder type). The NALU packet can be encapsulated in an IP transport packet (e.g., RTP packet) which is communicated from a source node to a destination node via a plurality of intermediary nodes (e.g., nodes 104-122 of the communication network 103). Upon detecting a network congestion, any of the nodes in the communication network 103 can use its PPM module to determine whether to discard or forward the packet based on inspecting the NALU headers and obtaining the priority information. Example NALU headers and corresponding priority information for different types of encoders are illustrated and discussed in connection with FIGS. 3-7.

NALU Header for H.264

FIG. 3 is a diagram of a H.264 network abstraction layer unit (NALU) header 300, which can be used in connection with some example embodiments.

The H.264 video codec has a very broad application range that covers all forms of digital compressed video, from low bitrate Internet streaming applications to HDTV broadcast and digital cinema applications with nearly lossless coding. The coded video data is organized into NAL units, each of which contains an integer number of bytes. The H.264/AVC specification adopts a byte stream format. Each NAL unit has a prefix of a specific pattern of three bytes, which is called a start code prefix. The boundaries of the NAL unit can be detected by searching the coded data for this unique start code prefix pattern. A set of NAL units in a specified form comprises an access unit. The decoding of each access unit results in one decoded picture.

As illustrated in FIG. 3, the H.264 NALU header includes a forbidden_zero_bit (F), a nal_ref_idc (NRI) field, and a type field. The forbidden_zero_bit can be configured with a value of 0 to indicate that the NAL unit type octet and payload should not contain bit errors or other syntax violations. A value of 1 indicates that the NAL unit type octet and payload may contain bit errors or other syntax violations.

The NRI field can be configured with a value of 00 to indicate that the content of the NAL unit is not used to reconstruct reference pictures for inter picture prediction. Such NAL units can be discarded without risking the integrity of the reference pictures. Values greater than 00 indicate that the decoding of the NAL unit maintains the integrity of the reference pictures. As used herein, the term "reference pictures" (or "reference frames") indicates a frame at a first time (e.g., t0) in a video stream which can be used for estimating and constructing a video frame at a second time (e.g., t1), where the second time is subsequent to the first time. For example, if a video stream includes a time lapse video of a ship sailing across the screen, a picture/frame of the ship at time t0 can be used to estimate a picture of the ship at a subsequent time t1.

In some aspects, the priority information associated with the NRI field can be used for configuring a discarding order (e.g., an order in which packets can be discarded). For example, the highest transport priority is an NRI of 11, followed by 10, then 01, and finally, 00 (which indicates packets with the lowest priority).

The H.264 NALU header 300 further includes a type field, which specifies the NAL unit payload type.

Figure 4:
FIG. 4 is a diagram illustrating an example mapping between an NRI field of the H.264 NALU header of FIG. 3 and a NALU type, which can be used in connection with some example embodiments.

FIG. 4 is a diagram 400 illustrating an example mapping between an NRI field of the H.264 NALU header of FIG. 3 and a NALU type, which can be used in connection with some example embodiments. As illustrated in FIG. 4, different NALUs can include different types of video information, which can be associated with different priority information (e.g., the values of the NRI field). Determination on whether to discard or process (or forward) a packet can be based on the priority information stored by the NRI field in the corresponding NALU header.

The syntax and semantics of the NAL unit type octet can include the essential properties of the NAL unit type octet in the NAL unit header. The RTP packet for H.264 video inherits the same NAL unit header. As shown in FIG. 3, the 2 bits NRI field (i.e., nal_ref_idc) indicates the relative importance/transport priority of the NRI unit determined by the encoder. For example, a value of 00 indicates that the content of the NAL unit is not used to reconstruct reference pictures for inter picture prediction. Such NAL units can be discarded without risking the integrity of the reference pictures. Values greater than 00 indicate that the decoding of the NAL unit is required to maintain the integrity of the reference pictures. In some aspects, the value of NRI can be equal to 0 for all NAL units having nal_unit_type equal to 6, 9, 10, 11, or 12. For NAL units having nal_unit_type equal to 7 or 8 (indicating a sequence parameter set or a picture parameter set, respectively), an H.264 encoder can set the value of NRI to '11'. For coded slice NAL units of a primary coded picture having nal_unit_type equal to 5 (indicating a coded slice belonging to an instantaneous decoder refresh (IDR) picture), an H.264 encoder sets the value of NRI to '11'. Non-IDR coded slice can be specified with '10' NRI value, coded slice data partition A has '10' NRI value, while partition B and C have '01' NRI value.

Referring again to FIG. 3, the type field indicates the payload format with the following three different payload structures:

(a) Single NAL Unit Packet: Contains only a single NAL unit in the payload. The NRI field is associated with this single NAL unit.

(b) Aggregation Packet (AP): Packet type used to aggregate multiple NAL units into a single RTP payload. This packet exists in four versions, the Single-Time Aggregation Packet type A (STAP-A), the Single-Time Aggregation Packet type B (STAP-B), Multi-Time Aggregation Packet (MTAP) with 16-bit offset (MTAP16), and Multi-Time Aggregation Packet (MTAP) with 24-bit offset (MTAP24). A NAL unit header is followed by one or more NAL units in aggregation packets. The value of NRI is the maximum of all the NAL units carried in the aggregation packet.

(c) Fragmentation Unit (FU): Used to fragment a single NAL unit over multiple RTP packets. This type of packet can exist with two versions, FU-A and FU-B respectively. Each FU packet has a FU indicator which has the same format as above. The value of the NRI field can be set according to the value of the NRI field in the fragmented NAL unit, which means all the FU packets belonging to the same NAL unit have the same NRI value.

NALU Header for H.265

FIG. 5 is a diagram of a H.265 NALU header 500, which can be used in connection with some example embodiments.

The H.265/HEVC standard significantly improves coding efficiency over H.264. Similarly, H.265 also includes a Video Coding Layer (VCL), which can be used to refer to the coding-tool features, and a NAL, which can be used to refer to the systems and transport interface aspects of the codecs. HEVC includes an improved support of temporal scalability over H.264, by inclusion of the signaling of Temporal ID in the NAL unit header. HEVC maintains the NAL unit concept of H.264 with modifications.

The RTP packet for H.265/HEVC video uses a two-byte NAL unit header as shown in FIG. 5. The 3-bit field TID specifies the temporal identifier of the NAL unit plus 1. The value of Temporal ID is equal to TID minus 1. The TID value indicates (among other things) the relative importance of an RTP packet. For example, because NAL units belonging to higher temporal sub-layers are not used for the decoding of lower temporal sub-layers, NAL units belonging to higher temporal sub-layers will have lower priority than lower temporal sub-layers. Thus, a lower value of TID indicates a higher importance. More-important NAL units might need to be better protected against transmission loss or packet dropping than less-important NAL units.

The LayerId field (or nuh_layer_id) is 6 bits. In some aspects, this field can be equal to zero in HEVC. It is anticipated that in future scalable or 3D video coding extensions of this specification, this syntax element will be used to identify additional layers that may be present in the coded video sequence (CVS), where a layer may be, e.g., a spatial scalable layer, a quality scalable layer, a texture view, or a depth view.

The type field indicates the different types of RTP packet payload structures. In some aspects, the following types can be configured:

(a) Single NAL Unit Packet: Contains only a single NAL unit in the payload. The TID field is associated with this single NAL unit.

(b) Aggregation Packet (AP): Packet type used to aggregate multiple NAL units into a single RTP payload. A payload header is followed by one or more NAL units in aggregation packets. The value of TID can be set as the lowest value of TID of all the aggregated NAL units.

(c) Fragmentation Unit (FU): Used to fragment a single NAL unit over multiple RTP packets. Each FU packet has a FU payload header which has the same format as above. The value of the TID field is set according to the value of the TID field in the fragmented NAL unit, which means all the FU packets belonging to the same NAL unit have the same TID value.

(d) Payload Content Information (PACI): Used to increase the payload header efficiency. The value of TID is a copy of the TID field of the PACI payload NAL unit or NAL-unit-like structure.

NALU Header for SVC

FIG. 6 is a diagram of a scalable video coding (SVC) NALU header 600, which can be used in connection with some example embodiments. Scalable Video Coding (SVC) extension of the H.264/AVC video coding standard defines a coded video representation in which a given bitstream offers representations of the source material at different levels of scalability: spatial (picture size), quality (or Signal-to-Noise Ratio (SNR)), and temporal (pictures per second). Bitstream components associated with a given level of spatial, quality, and temporal fidelity are identified using corresponding parameters in the bitstream: dependency_id, quality_id, and temporal_id. There are three additional octets in the NAL unit header of SVC RTP packets, which are illustrated in FIG. 6.

In H.264/AVC, NAL unit types 14, 15, and 20 are reserved for future extensions. SVC uses these three NAL unit types as follows: NAL unit type 14 is used for prefix NAL unit, NAL unit type 15 is used for subset sequence parameter set, and NAL unit type 20 is used for coded slice in scalable extension. The SVC NALU header 600 can include the following bits and fields.

(a) R: 1 bit (reserved_one_bit). Reserved bit for future extension. R must be equal to 1. The value of R must be ignored by decoders.

(b) I: 1 bit (idr_flag). This component specifies whether the layer representation is an instantaneous decoding refresh (IDR) layer representation (when equal to 1) or not (when equal to 0).

(c) PRID: 6 bits (priority_id). This flag specifies a priority identifier for the NAL unit. A lower value of PRID indicates a higher priority.

(d) N: 1 bit (no_inter_layer_pred_flag). This flag specifies, when present in a coded slice NAL unit, whether inter-layer prediction may be used for decoding the coded slice (when equal to 1) or not (when equal to 0).

(e) DID: 3 bits (dependency_id). This component indicates the inter-layer coding dependency level of a layer representation. At any access unit, a layer representation with a given dependency_id may be used for inter-layer prediction for coding of a layer representation with a higher dependency_id, while a layer representation with a given dependency_id shall not be used for inter-layer prediction for coding of a layer representation with a lower dependency_id.

(f) QID: 4 bits (quality_id). This component indicates the quality level of a medium-grain quality scalability (MGS) layer representation. At any access unit and for identical dependency_id values, a layer representation with quality_id equal to ql uses a layer representation with quality_id equal to ql−1 for inter-layer prediction.

(g) TID: 3 bits (temporal_id). This component indicates the temporal level of a layer representation. The temporal_id is associated with the frame rate, with lower values of temporal_id corresponding to lower frame rates. A layer representation at a given temporal_id typically depends on layer representations with lower temporal_id values, but it never depends on layer representations with higher temporal_id values.

(h) U: 1 bit (use_ref_base_pic_flag). A value of 1 indicates that only reference base pictures are used during the inter-prediction process. A value of 0 indicates that the reference base pictures are not used during the inter-prediction process.

(i) D: 1 bit (discardable_flag). A value of 1 indicates that the current NAL unit is not used for decoding NAL units with values of dependency_id higher than the one of the current NAL unit, in the current and all subsequent access units. Such NAL units can be discarded without risking the integrity of layers with higher dependency_id values. The discardable_flag equal to 0 indicates that the decoding of the NAL unit maintains the integrity of layers with a higher dependency_id.

(j) O: 1 bit (output_flag). This field is related to the decoded picture output process (e.g., as defined in Annex C of H.264 specification).

(k) RR: 2 bits (reserved_three_2 bits). Reserved bits for future expansion. The RR field must be equal to "11" (in binary form). The value of the RR field must be ignored by decoders.

NALU Header for H.266

Figure 7:
FIG. 7 is a diagram of a H.266 NALU header, which can be used in connection with some example embodiments.

FIG. 7 is a diagram of a H.266 NALU header 700, which can be used in connection with some example embodiments. Versatile Video Coding (VVC) is formally published as both ITU-T Recommendation H.266 and ISO/IEC International Standard 23090-3. VVC provides significant coding efficiency gains over H.265/HEVC, and other earlier video codecs. The RTP payload format for H.266/VVC allows for packetization of one or more Network Abstraction Layer (NAL) units in each RTP packet payload as well as fragmentation of an NAL unit into multiple RTP packets.

In some aspects, VVC maintains the NAL unit concept of HEVC with modifications. VVC uses a two-byte NAL unit header, as illustrated in FIG. 7. The payload of a NAL unit refers to the NAL unit excluding the NAL unit header.

Similar to H.265, the TID value indicates (among other things) the relative importance of an RTP packet, for example, because NAL units belonging to higher temporal sublayers are not used for the decoding of lower temporal sublayers. A lower value of TID indicates a higher importance. More-important NAL units might need to be better protected against transmission loss or packet dropping than less important NAL units.

The LayerID field can be used to identify the layer a NAL unit belongs to, where a layer may be, e.g., a spatial scalable layer, a quality scalable layer, a layer containing a different view, etc. The LayerID has integer values, where higher values designate components that are higher in the hierarchy. Decoding of a particular component can be based on the availability of all the components it depends upon, either directly, or indirectly. In this regard, the NAL unit with lower LayerID can be used to predict the NAL units with higher LayerID and, therefore, likely to be more important.

In some aspects, the Type field indicates the following types of RTP packet payload structures.

(a) Single NAL Unit Packet: Contains only a single NAL unit in the payload. The TID field is associated with this single NAL unit.

(b) Aggregation Packet (AP): Packet type used to aggregate multiple NAL units into a single RTP payload. A payload header can be followed by one or more NAL units in aggregation packets. The value of TID can be set as the lowest value of TID of all the aggregated NAL units.

(c) Fragmentation Unit (FU): Used to fragment a single NAL unit over multiple RTP packets. Each FU packet has a FU payload header which has the same format as above. The value of the TID field is set according to the value of the TID field in the fragmented NAL unit, which means all the FU packets belonging to the same NAL unit have the same TID value.

In some embodiments, the PPM module 144 can be configured to perform priority-based discarding of RTP packets based on priority information in the different types of NALU headers discussed above. Due to the explicit layering in the protocol stack, the upper layer data or headers are transparent to the network layer. The priority or importance associated with the NAL units encapsulated in RTP packets is invisible to intermediate routers (e.g., non-MANE routers in the communication network 103). In comparison, a MANE (such as a middlebox or application layer gateway) is capable of parsing certain aspects of the RTP payload headers or the RTP payload and reacting to the contents (e.g., using priority information from the parsed packet for determining whether the RTP packet should be discarded during network congestion). The advantage of using MANEs is that they allow packets to be dropped according to the needs of the media coding. For example, if a MANE has to drop packets due to congestion on a certain link, it can identify and remove those packets whose elimination produces the least adverse effect on the user experience based on priority information included in the NALU header. In some embodiments, MANEs can use the PPM module 144 to access a field that indicates the importance of a unit of media (for example, video) data such as the NALU (e.g., as discussed above in reference to FIGS. 3-7). Example priority information from NALU headers can include the following:

(a) The 2-bit NRI field in H.264 and SVC NAL unit header.

(b) The 3-bit TID filed in H.265 and H.266 NAL unit headers.

(c) The 6-bit PRID field in the SVC NAL unit extension header, which provides even finer granularity of priority differentiation for NAL units in SVC.

(d) The 6-bit LayerID field in H.266 NAL unit payload header, which provides even finer granularity of priority differentiation for NAL units in VVC.

In some aspects, data packet 142 can be configured (e.g., based on configurations discussed in connection with FIGS. 8-13) as a packet data format referred to as data packet.

FIG. 8 illustrates a diagram of a New IP header and data format which can be used in the network architecture of FIG. 1 in connection with some example embodiments. The data packet 801 is part of an Internet framework that brings several capabilities in the present technology. New IP is a data plane technology that defines a new IP packet format, its specification, and corresponding capabilities in the network nodes. Using the present technology, new and upcoming applications, such as industrial Internet, vehicle-to-infrastructure, autonomous systems, holographic type communications, etc., may be enabled over communication networks. The data packet 801 may be used for data transmission over a wide variety of networks having different capabilities and requirements. However, other variations of data packets are also part of this application, including the described specifications, subsets of the described specifications, and combinations of the described specifications with other specifications. These can all be collectively considered as data packets for purposes of the present disclosure.

As illustrated in FIG. 8, the data packet 801 includes a header field 801*a*, followed by a shipping specification field

801*b*, a contract specification field 801*c*, and a payload specification field 801*d*. It is appreciated that the order of the specifications as illustrated is one embodiment, and that the specification may be placed in any order. It is also appreciated that additional or fewer specifications may be included in the format. For example, one format may only include the shipping specification field and the payload specification field, whereas another format may include the contract specification and payload specification field. In another example, additional specifications may be added.

The header field 801*a* identifies the beginning of the data packet 801 and describes offsets for the specification fields. For example, the header field 801*a* includes a shipping offset (or pointer) 802*a* of the shipping specification 801*b*, a contract offset (or pointer) 802*b* of the contract specification 801*c*, and a payload offset (or pointer) 802*c* of the payload specification 801*d*. In one embodiment, the header field 801*a* may also include a signature field (CTRL) 803, such as implementation-specific details (e.g., flags) and a total length 804 of the packet. In a further embodiment, the offset of a specification and the total length of the packet may indicate whether the packet is corrupt. For example, when none of the offsets exceed the total length of the packet, the packet is not corrupt. In another example, the packet may be corrupt when one of the offsets exceeds the total length of the packet. For instance, the payload offset 802*c* may be set to a length of 20 and the total length of the offsets may be set to 10. Since the payload offset length is greater than the total length of the offsets, the packet may be identified as corrupt.

In another embodiment, the signature field (CTRL) 803 may indicate whether the header has been corrupted during transit. For example, the signature field may be a hash, a cyclic redundancy check (CRC), or a public/private key mechanism. Other variations on these fields are also possible. For example, in some embodiments the payload specification 801*d* can include a field indicating its own length, which can be used with the offsets to compute the length of the entire packet. Similarly, in some embodiments the header 801*a* can include a shipping offset 802*a* and lengths of the shipping specification and the contract specification, instead of the contract offset and the payload offset. More generally, a combination of offsets and/or lengths of the various fields can indicate their locations and lengths in the packet.

The shipping specification field 801*b* provides flexible and contextual addressing in heterogeneous networks and inter-networking systems. In one embodiment, the shipping specification field 801*b* allows for different types and formats of addresses based on the functionality and network connecting devices. In one other embodiment, the shipping specification field 801*b* enables backward compatibility with existing addressing schemes, such as IPv4 and IPV6.

The contract specification field 801*c* supports service and application awareness, where a contract specified in the contract specification field 801*c* allows for robust service delivery models and provides guarantees of Service Level Objectives (SLO) such as latency, capacity, reliability, etc. In one embodiment, the contract specification field 801*c* focuses on high-precision communication (HPC) and the life cycle of any type of service in the network to enable a variety of services, as well as their operational and administrative control at the finest packet-level granularity. The contract in the contract specification field 801*c* create avenues for the next generation of programmability, customization, and non-monolithic data plane pipelines, while also providing the ability to satisfy requirements to perform telemetry, elastically grow services on-demand and create new business models around HPC. The contract specification field 801*c* is described in more detail below with reference to FIGS. 10-13.

The payload specification field 801*d* specifies capabilities through which entropy and quality of information is carried in the payload and which may be used to improve throughput and achieve robustness of data transmission. In one embodiment, the payload specification field 801*d* associates semantics, such as user-defined or application semantics, with the user data while maintaining payload integrity. For example, when a data packet is received by a node from an end-user in the network, the data payload remains usable even if the payload does not match bit-by-bit with the payload from the sender. Rather, using the semantics associated with the user data, the receiving node may use partial information carried in the payload. This partial-packet reception helps to mitigate re-transmission overhead and delays when faced with slow or congested conditions.

Accordingly, using the various specifications, the data packet 801 is flexible and may be changed or modified to suit the particular needs of a network operation or conditions presented in the network. For example, and for purposes of discussion, assume that addressing enhancements are an essential requirement in a particular network implementing the data packet. To enhance addressing, an operator can deploy and manage addressing features using the shipping specification field 801*b*. Similarly, if a need for Beyond Best-Effort (BBE) service-aware infrastructure is more critical, then the contract specification field 801*c* may be deployed by the network operator. Later, as needs for payload enhancements become necessary, the payload specification field 801*d* may be incorporated in the network.

Figure 9:
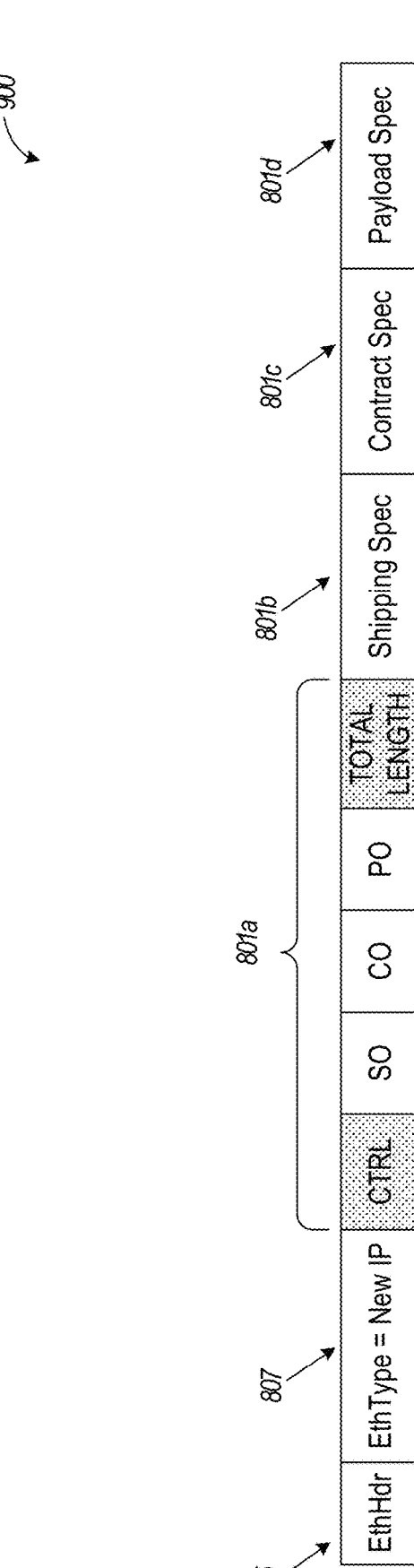
FIG. 9 illustrates an example New IP packet in an Ethernet frame, which can be used in connection with some example embodiments.
Figure 10:
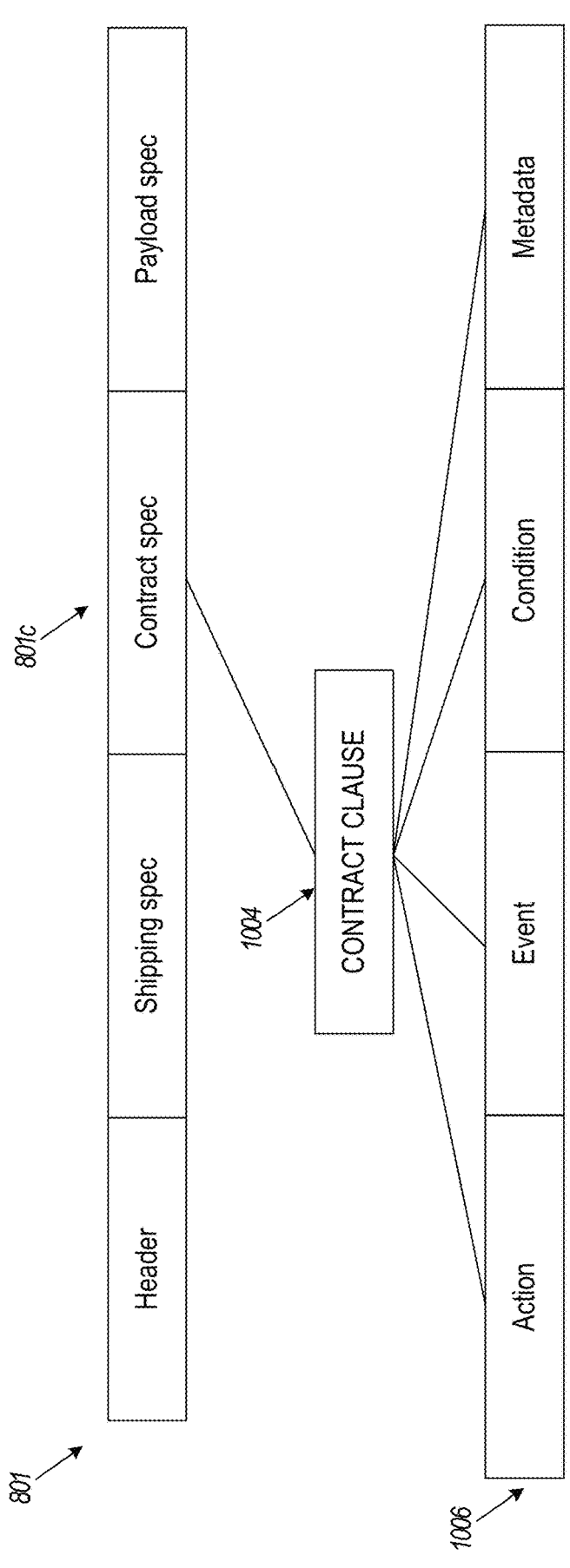
FIG. 10 illustrates an example contract specification field in the data packet of FIG. 9, which can be used in connection with some example embodiments.

One example embodiment of the data packet 801 is shown in FIG. 9. FIG. 9 illustrates an example New IP packet in an Ethernet frame 900, which can be used in connection with some example embodiments. In the depicted embodiment, an Ethernet header (EthHdr) field 805 is followed by an Ethernet type (EthType) field 807, which specifies that the type is a New IP format of the data packet 801. The New IP format is encapsulated by the Ethernet frame 900 and includes a header field 801*a*, the shipping specification 801*b*, the contract specification 801*c*, and the payload specification 801*d*.

FIG. 10 illustrates an example contract specification field in the data packet of FIG. 9, which can be used in connection with some example embodiments. The data packet 801 is described above with reference to FIG. 8 and FIG. 9. The current embodiment focuses on the contract specification field of the data packet format.

Figure 11:
FIG. 11 illustrates an example of a contract clause in the contract specification field of FIG. 10, which can be used in connection with some example embodiments.

FIG. 11 illustrates an example of a contract clause 1100 (or contract 1100) in the contract specification field of FIG. 10, which can be used in connection with some example embodiments.

FIG. 12 illustrates an example of actions 1200 that may be specified in a contract clause, which can be used in connection with some example embodiments.

Figure 13:
FIG. 13 illustrates an example of events and conditions that may be specified in a contract clause, which can be used in connection with some example embodiments.

FIG. 13 illustrates an example of events and conditions 1300 that may be specified in a contract clause, which can be used in connection with some example embodiments.

The contract specification field 801*c* enables a large selection of network capabilities, their functioning and regulative control at the finest packet-level granularity. The contract specification 801*c* may include several contract clauses (e.g., contract clause 1004, also referred to as one or more contract clauses 1004). The contract clause 1004 independently defines service specific actions, events, and conditions. Production rules for a contract may be represented in a context-free grammar style, as shown in FIG. 11. In some aspects, nodes in the communication network 103 fulfill the contract 1100, assuming the contract is agreed to by the packet sender (e.g., source node 102) and the packet receiver (e.g., destination node 124) and the communication network 103. The contract 1100 describes a formal service-specific arrangement between two or more parties, which includes one or more contract clauses 1004 to describe the type of network service capability, actions and accounting information.

In one embodiment, the contract 1100 is of a fixed length. In another embodiment, the contract 1100 is of variable length. In the case of more than one contract, the location of the contract 1100 may be determined by a list of offsets associated with each contract.

In some aspects, service assurance requirements at a packet level are provided through use of the contract 1100. In particular, contract 1100 carries any combination of specific attributes associated with time-engineered services, high-throughput media services, mission-critical ultra-reliable services, and other services. In one embodiment, the structure of the contract 1100 is defined in a Chomsky style. For example, a contract 1100 can follow one or more contracts, where a contract consists of one or more contract clauses 1004, and each contract clause 1004 can be in one of the following formats: (1) event, condition, action (ECA); (2) event, condition, action, metadata; (3) action only; or (4) action and metadata. Compared to traditional QoS, contract 1100 operates at much lower-level-per packet, and instructs in high-level abstract commands.

In some aspects, each contract clause includes an action, and may optionally include a combination of an event, condition (together shown as event, condition, action (ECA) 1006) and metadata. Similar to the entire contract 1100, the event, condition, action, and metadata of the contract may also be a fixed length or a variable length. In one embodiment, an atomic contract ECA exists in which the event and condition are empty. In other embodiments, a contract can omit the event, condition, and/or metadata fields. A contract clause 1004 describes how the nodes in the communication network 103 treat the packet as it traverses the network 103 based on the event and condition, which may be predefined. Given a predefined event and condition has occurred, various actions are processed by the nodes in the communication network 103 (e.g., using the node's PPM module), as specified in the contract.

For example, in order to support ultra-reliable low-latency communication (uRLLC) in 5G, two contracts C1 and C2 may be used, where the C1 contract clause indicates a bounded latency action and the C2 contract clause has a NoPktloss action (i.e., the conditions of latency is bounded to a low latency, and reliability is achieved through no packets being lost, are both to be met). Actions 1200 are described with reference to FIG. 12.

The optional metadata contains data about the packet, e.g. accounting information, customized statistics about the flow on intermediate hops, the contextual information about the user and application, etc. The in-network node intelligence is naturally embedded and supported by the New IP framework. FIG. 12 illustrates an example of actions 1200 that may be specified in a contract clause. An action set 1200 includes one or more actions defined in the contract specification field 801*c* that is known and processed by all New IP nodes (e.g., nodes capable of processing data packets). For example, APP 126 can insert operator-defined and/or application-defined actions. Such actions may be generally categorized into operations, monitoring, telemetry, or signaling.

In some aspects, new contracts as defined in the specification may be implemented across different hardware platforms using different methods or algorithms. However, the result of implementation leads to packet delivery guarantees between the sender and the receiver. Several actions are described below (some of which are shown in action 1200 in FIG. 12):

(a) Action BoundedLatency(t) (also referred to as "InTimeGuarantee") instructs the router to deliver a packet at any time before time t (within a pre-configured unit of time). It may use corresponding metadata to describe an end-to-end network latency or available latency since transmission starts from the sender. In some aspects, an algorithm referred to as latency-based forwarding (LBF) implements this action. Instead of a class of services, contract clauses embed exact parameters and objectives in the packet.

(b) Action OnTimeDelivery(t,t') with metadata t and t' as a total end-to-end time and elapsed time respectively delivers packet at a specific time in order to accommodate very low values of time-jitter.

(c) Action Coordinate enables multi-user applications to adjust packet delivery timings in the network. The action may need to identify co-flows, which can be done from the address casting part of the Shipping Spec along with timing dependency parameters as specified in metadata.

(d) Action NoPacketLoss instructs networks to use every means available to deliver the packet.

(e) Action PreferredPath may instruct the nodes to use a set of node addresses or other forms of path identifiers embedded in the packet to provide guarantees that the packet is transmitted along that set of node addresses or identified paths.

(f) Action PktTrace tracks the packet flow behavior across the network and may be used to understand the end-to-end service assurance and performance degradations in particular. For example, in order to understand hop-by-hop latency, PktTrace action may capture a path in the network along with the time spent in each node. An end user initiates a contract with a PktTrace action and event indicating "measure time." Each node in end-to-end path then inserts its own identification and time spent in the metadata of the packet. Similarly, if the PktTrace action is used without any event, then metadata inserted by the node is an identifier. In this way, the service knows the path taken by the packet.

(g) Action PktMonitorhelps gain visibility into the current state of the system. This action captures events in a network relating to queue thresholds, packet drops, etc. Such actions identify situations such as congestion before they occur by monitoring the thresholds. For example, in order to identify real-time congestion, if a queue at a node is built up to 70%, then this action sets the corresponding metric value in the metadata of the packet, so the information can be retrieved later.

(h) Action ReportInsuringParty is an operator driven action to be executed when a service objective violation occurs; the node in error is then required to report such violations to the insuring party. Operators can use this functionality for the assessment of damages due to service level objectives violations, which may help build trust between different network systems.

Events are local occurrences or a state of a network node that can impact the behavior of a packet or flow in transit. Events such as queue levels, path changes, drops, etc. determine congestion or fault, while other events may be operands, such as a packet count, next hop, etc. that meet a specific value.

Conditions are arithmetic or logical operators to perform conditional checks. For example, a condition may be set as less than or equal (LE) and greater than or equal (GE). These conditions may be used to check against thresholds, data rates or any other measure. Several other logical operators, such as OR, XOR, and AND may also be used to derive the results from events and actions. For example, an action may be executed when a queue level (event) is greater than or equal to (condition) a specified threshold.

In some aspects, a data processing instruction can be included in an RTP packet, which instructs a receiving node to inspect the priority bits in H.264, H.265, or SVC RTP packets (e.g., the RTP NAL unit has a header extension, which includes other fields that could help the existing MANE decide how to handle packets when network congestion occurs), or forward the packet to a MANE which has access to the RTP packet. The following configurations can be used in connection with the above-described New IP packets.

Configuration (1): The New IP packet Contract field can be used for indicating an instruction for the receiving node (e.g., a router) to inspect RTP NAL unit headers and obtain priority information (e.g., for determining whether to discard or forward the packet in case of network congestion).

Configuration (2): Contract metadata can be included as part of the New IP packet. In some aspects, the metadata can be used to copy the priority bits from NRI for H.264 and SVC, or TID for H.265 and SVC. In some aspects, the metadata can include priority information associated with finer granularity of priority (e.g., information copied from PRID (priority_ID)).

Configuration (3): The New IP packet Contract field can be used to configure a contract for forwarding a received packet (e.g., by a non-MANE node) to a MANE node for further determination on whether to discard or process (e.g., forward) the packet. In some aspects, the contract can further specify a specific MANE to receive the packet (e.g., at least one MANE trusted by the sender). In some aspects, contract metadata can include security context information, which can be accessed by the MANE node and used for authenticating the MANE node to access the information in the NALU header.

Configurations (1) and (2)

In some aspects, a network node receiving a New IP packet can be configured to determine (e.g., using a PPM module) which video RTP packet to be discarded based on the NAL NRI bits or other fields in the extended header for SVC video packets. The following uses NRI value as the example. The packets can be discarded according to the NRI value. For example, the node can first discard all packets/NALUs in which the value of the NRI field of the NAL unit type octet is equal to 0, then 1, then 2, then 3.

The following configurations can be used for notifications after discarding H.264 and SVC RTP packets. In some aspects, the network node receiving and discarding the packet (e.g., the New IP packet) can notify the sender not to send any lower priority slices. For example, if a partition A packet is discarded, the sender will be notified not to send the corresponding coded slice data partitions B and C, as their information is meaningless for decoders without partition A.

In some aspects, the network node discarding the packet can determine if the NALU is a fragmented NALU and can notify the sender not to send the sequential FUs of the same fragmented NALU, as their information is meaningless for decoders.

In some aspects, the following notifications can be generated by a network node after discarding RTP packets that are specific to SVC. In some aspects, the network node notifies the sender not to send the NAL units with QID higher than certain value respectively, according to the QID value of the dropped packet. In some embodiments, the network node notifies the sender not to send the NAL units with TID higher than certain value respectively, according to the TID value of the dropped packet. In some embodiments, the network node notifies the sender not to send the NAL units with DID higher than certain value respectively, according to the DID value of the dropped packet. In some aspects, the network node notifies the sender not to send the NAL units with PRID higher than a certain value, according to the PRID value of the dropped packet. In some aspects, the network node notifies the sender not to send NAL units belonging to higher temporal sub-layers (i.e., those NAL units with a high value of TID) until the sending bitrate drops to an acceptable range.

In some embodiments, the network router can generate the following notifications after discarding RTP packets associated with H.265. In some embodiments, the network node notifies the sender not to send NAL units belonging to higher temporal sub-layers (i.e., those NAL units with a high value of TID) until the sending bitrate drops to an acceptable range. In some embodiments, the network node notifies the sender not to send those FUs where the leading FUs belonging to the same NAL unit have been dropped or those dependent slice segments when the leading slice segments belonging to the same slice have been dropped, because the trailing FUs or dependent slice segments are meaningless to most decoders.

Configuration (3)

Figure 14:
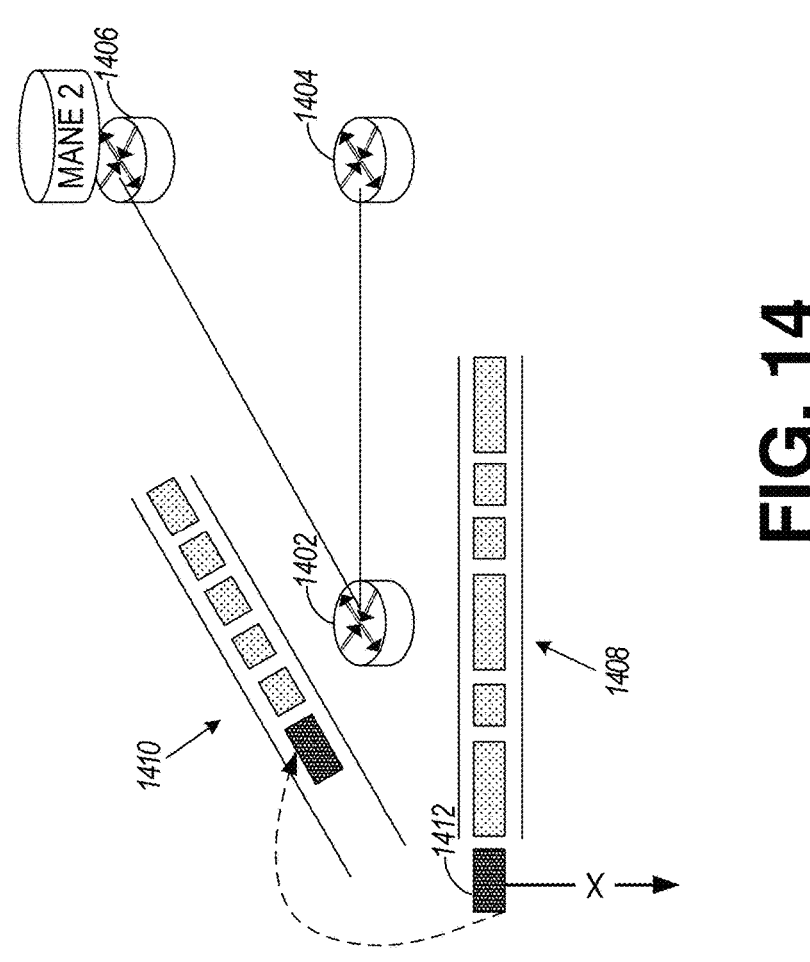
FIG. 14 is a diagram illustrating forwarding of an IP data packet from a communication node to a media aware network element (MANE) for processing or discarding based on an instruction for packet communication included in the IP data packet, in connection with some example embodiments.

FIG. 14 is a diagram 1400 illustrating forwarding of an IP data packet from a communication node to a media aware network element (MANE) for processing or discarding based on an instruction for packet communication included in the IP data packet, in connection with some example embodiments. For example, node 1402 receives packet 1412. The PPM module of node 1402 can detect an instruction (e.g., communicated via a contract in an IP packet such as a New IP packet) which indicates a preference that the packet be processed by MANE 1406. In this regard, instead of discarding the packet, packet 1412 is moved from the outgoing queue 1408 (for network traffic to node 1404) and is placed in the outgoing queue 1410 for MANE 1406.

In some embodiments, node 1402 is congested. Instead of dropping an RTP video packet (e.g., packet 1412) completely, the PPM module of node 1402 reviews the contract and gets information of trusted MANE(s). In some aspects, each node maintains a routing table entry towards all nearby MANE(s). Node 1402 selects a MANE (e.g., MANE 1406) satisfying the following conditions: being trusted by the sender and identified by the metadata, the interface towards the MANE is not congested, and if there are multiple MANE(s) satisfying the previous two conditions, select the one with least detour towards the receiver.

For example, MANE 1406 is selected. The packet is placed in the outgoing queue 1410 of the interface towards the selected MANE instead of being completely dropped. The selected MANE receives the packet and decides whether to drop it based on the importance indicated by the priority information in the packet (e.g., NRI or LayerID). In some aspects, the selected MANE also follows the same practices as described in the previous slides to send notifications to the sender according to the information of a dropped packet.

In some aspects, MANE can be configured as an overlay network element that might be co-located with several nodes (e.g., routers), e.g., at the network edge. In this regard, when network congestion occurs in other nodes that are not deployed with MANE capabilities, the packet discarding can be subject to a Differential Services (DiffServ) classification. DiffServ uses a 6-bit differentiated services code point (DSCP) in the 8-bit differentiated services field (DS field) in the IP header for packet classification purposes. In theory, a network could have up to 64 different traffic classes by using the 64 available DSCP values. However, the commonly defined per-hop behaviors most often include the following four categories:

(a) Default Forwarding (DF) PHB, which is typically best-effort traffic.

(b) Expedited Forwarding (EF) PHB, which is dedicated to low-loss, low-latency traffic.

(c) Assured Forwarding (AF) PHB, which gives assurance of delivery under prescribed conditions.

(d) Class Selector PHBs, which maintain backward compatibility with the IP precedence field.

In some aspects, the following two video types can be considered: interactive video and non-interactive video. The video stream from both types could be encoded according to H.264, SVC, H.265, or H.266. For H.264 and SVC, the NAL units have the NRI field to indicate the discarding priority of the RTP packets. For H.265 and H.266, the NAL units have the TID field to indicate the discarding priority of the RTP packets. The NRI field is of 2 bits, and the TID field is of 3 bits, thus the DSCP value can be mapped according to either the NRI value or the TID value, as well as the video types. Example mapping tables are illustrated in FIG. 15 and FIG. 16.

FIG. 15 illustrates a table 1500 of example differentiated services code point (DSCP) values for RTP packets according to nal_ref_idc (NRI) value and video type (with H.264 or SVC video encoder), in connection with some example embodiments.

FIG. 16 illustrates a table 1600 of example DSCP values for RTP packets according to temporal ID (TID) value and video type (with H.265 or H.266 video encoder), in connection with some example embodiments.

In general, the NAL units with the same NRI value or the TID value in interactive video has higher priority than in non-interactive video. The recommended DSCP values for RTP packets according to NRI value and video type are shown in table 1500. The recommended DSCP values for RTP packets according to TID value and video type are shown in table 1600. These values are based on the DiffServ framework and recommended values.

In some aspects, either the video host or the MANE at the DiffServ domain edge can do the mapping and set up the DSCP value for each RTP packet. The discarding precedence of the RTP packets can be determined when link congestion happens.

Compared to H.265, SVC and H.266 employ additional scalability other than the temporal scalability, namely spatial scalability and quality scalability. Thus in the NAL extension header for SVC, there is an additional field (e.g., PRID) used to indicate the importance of the RTP packet at finer granularity. The PRID field occupies 6 bits additionally. In the NAL unit header for H.266, the LayerID is used to identify the layer a NAL unit belongs to and wherein a layer may be, e.g., a spatial scalable layer, a quality scalable layer, a layer containing a different view, etc. The LayerID field provides the importance information of the RTP packet at finer granularity as well. The LayerID field occupies 6 bits additionally. In some aspects, it may not be feasible to use the DSCP mapping to indicate the additional discarding precedence provided by the 6 bits PRID, and the 6 bits LayerID. In some aspects, other solutions can be configured if discarding precedence at finer granularity is considered to be supported.

Qualitative Communication

In some aspects, the qualitative communication service can be used with the disclosed techniques to prevent the network from dropping the entire packet when a packet error or network congestion occurs, and to selectively drop parts of the packet to reduce the packet size, such that the remainder of the packet may be able to reach the receiver.

In some aspects, qualitative payload carries quality, entropy or semantics of the payload. In some embodiments, two approaches of realizing quantitative payload can be configured-packet size and chunk size-based approaches. In some embodiments, the packet size is reduced to the chunk size, and each chunk is transmitted as an independent packet, as illustrated in FIG. 17.

Figure 17:
FIG. 17 illustrates a diagram of reducing a packet to multiple chunks for communication, in connection with some example embodiments.

FIG. 17 illustrates a diagram 1700 of reducing a packet to multiple chunks for communication, in connection with some example embodiments.

However, this approach can result in increased overhead of the protocol headers, underlying packet latency for the same amount of user data, reduced bulk protocol throughput, and a greater number of packets to be processed by the network. In this regard, processing the resulting network packets using the disclosed techniques can improve processing efficiency and reduce congestion at each network node in the communication network communicating such reduced size packets.

FIG. 18 is a flowchart of a method 1800 suitable for data packet communication and processing, according to some example embodiments. The method 1800 includes operations 1802, 1804, 1806, 1808, and 1810. By way of example and not limitation, method 1800 is described as being performed by one or more of the components of the PPM module 144 (also referenced as the PPM module 1960 of FIG. 19 or PPM module 2060 of FIG. 20).

At operation 1802, an Internet protocol (IP) data packet (e.g., data packet 142) is received by a node in a communication network (e.g., node 108 using a PPM module 144). The IP data packet includes an IP network layer header and an IP network layer payload.

At operation 1804, the PPM module 144 parses the IP network layer payload to detect a Network Abstraction Layer Unit (NALU) (e.g., at least one of the NALUs 140 generated by the NAL encoder 138). The NALU can include a NALU header and a NALU payload.

At operation 1806, priority information is detected in the NALU header. For example, the priority information can include information discussed in connection with FIG. 3-FIG. 7. The priority information can indicate (or be associated with) a transport priority of the NALU.

At operation 1808, a differentiated services (DS) field in the IP network layer header is updated based on the transport priority to generate an updated IP data packet.

At operation 1810, the updated IP data packet is forwarded to a second node in the network for processing (e.g., determining whether to discard the packet or forward to another node) based on the updated DS field.

In some aspects, the PPM module 144 parses the IP data packet to detect a network instruction. In some aspects, the PPM module 144 determines the network instruction is an instruction for header inspection, and inspects the NALU header to detect the priority information. In some aspects, the inspecting is based on the instruction for the header inspection. In some aspects, the PPM module 144 determines the network instruction is an instruction for packet communication, and forwards the IP data packet to a media aware network element (MANE) in the network based on the instruction for the packet communication.

In some aspects, the PPM module 144 parses the IP data packet to determine metadata associated with the instruction, the metadata comprising authentication information associated with the MANE. In some aspects, the PPM module 144 authenticates the MANE prior to forwarding the IP data packet, the authenticating based on the authentication information.

In some aspects, the PPM module 144 parses the NALU header to detect a nal_ref_idc (NRI) field. The priority information includes a binary value stored by the NRI field. In some aspects, the PPM module 144 discards the NALU according to a discarding order associated with the binary value. In some aspects, the PPM module 144 communicates a notification to a sender of the IP data packet based on the discarding of the NALU. The notification notifies the sender to refrain from sending an additional IP data packet including an additional NALU. The additional NALU is associated with transport priority that is lower than the transport priority of the NALU. In some aspects, the PPM module 144 detects the NALU is a fractional unit of a plurality of functional units associated with a fragmented NALU. In some aspects, the PPM module 144 communicates a notification to a sender of the IP data packet based on the discarding, the notification notifying the sender to refrain from sending an additional functional unit of the plurality of functional units associated with the fragmented NALU.

In some aspects, the priority information is stored in at least one of a temporal ID (TID) field in the NALU header, when the NALU header is an H.264 or Scalable Video Coding (SVC) NALU header; a nal_ref_idc (NRI) field in the NALU header, when the NALU header is an H.265 or an H.266 NALU header; a priority ID (PRID) field in an SVC NALU extension header, when the NALU header is an SVC NALU header; and a layer ID (LayerID) field in the NALU header, when the NALU header is an H.266 NALU payload header.

In some aspects, the PPM module 144 parses the IP network layer header to detect a differentiated services (DS) field, detects a differentiated services code point (DSCP) stored in the DS field, and determines the priority information based on the DSCP.

In some aspects, the PPM module 144 maps the priority information to a differentiated services code point (DSCP) value using a mapping table. In some aspects, the PPM module 144 updates the DS field in the IP network layer header using the DSCP value.

In some aspects, the PPM module 144 decodes a second IP data packet received by the node, the second IP data packet comprising a data packet. In some aspects, the PPM module 144 parses the data packet to determine a contract clause, the contract clause comprising a metadata field storing metadata information. In some aspects, the PPM module 144 determines transport priority associated with the data packet based on the metadata information. In some aspects, the PPM module 144 performs one of discarding the data packet or forwarding the data packet to another node in the network based on the transport priority associated with the data packet.

In some aspects, the PPM module 144 decodes a second IP data packet, the second IP data packet having a second IP network layer header and a second IP network layer payload. In some aspects, the PPM module 144 parses the second IP data packet to detect the second IP network layer header comprises an extension header. In some aspects, the PPM module 144 parses the extension header to detect second priority information associated with the second IP data packet. In some aspects, the PPM module 144 performs one of discarding the second IP data packet or forwarding the second IP data packet to the second node in the network based on the second priority information.

In some aspects, the PPM module 144 decodes a second IP data packet, the second IP data packet having a second IP network layer header and a second IP network layer payload. In some aspects, the PPM module 144 parses the second IP data packet to detect the second IP network layer header comprises an IPV4 header. In some aspects, the PPM module 144 parses the IPV4 header to detect second priority information stored in an options field, the second priority information associated with the second IP data packet. In some aspects, the PPM module 144 performs one of discarding the second IP data packet or forwarding the second IP data packet to the second node in the network based on the second priority information.

In some aspects, the PPM module 144 parses the IP data packet to detect a network instruction. In some aspects, the PPM module 144 determines the network instruction is an instruction for header inspection. In some aspects, the PPM module 144 inspects the NALU header to detect the priority information, the inspecting based on the instruction for the header inspection.

Figure 19:
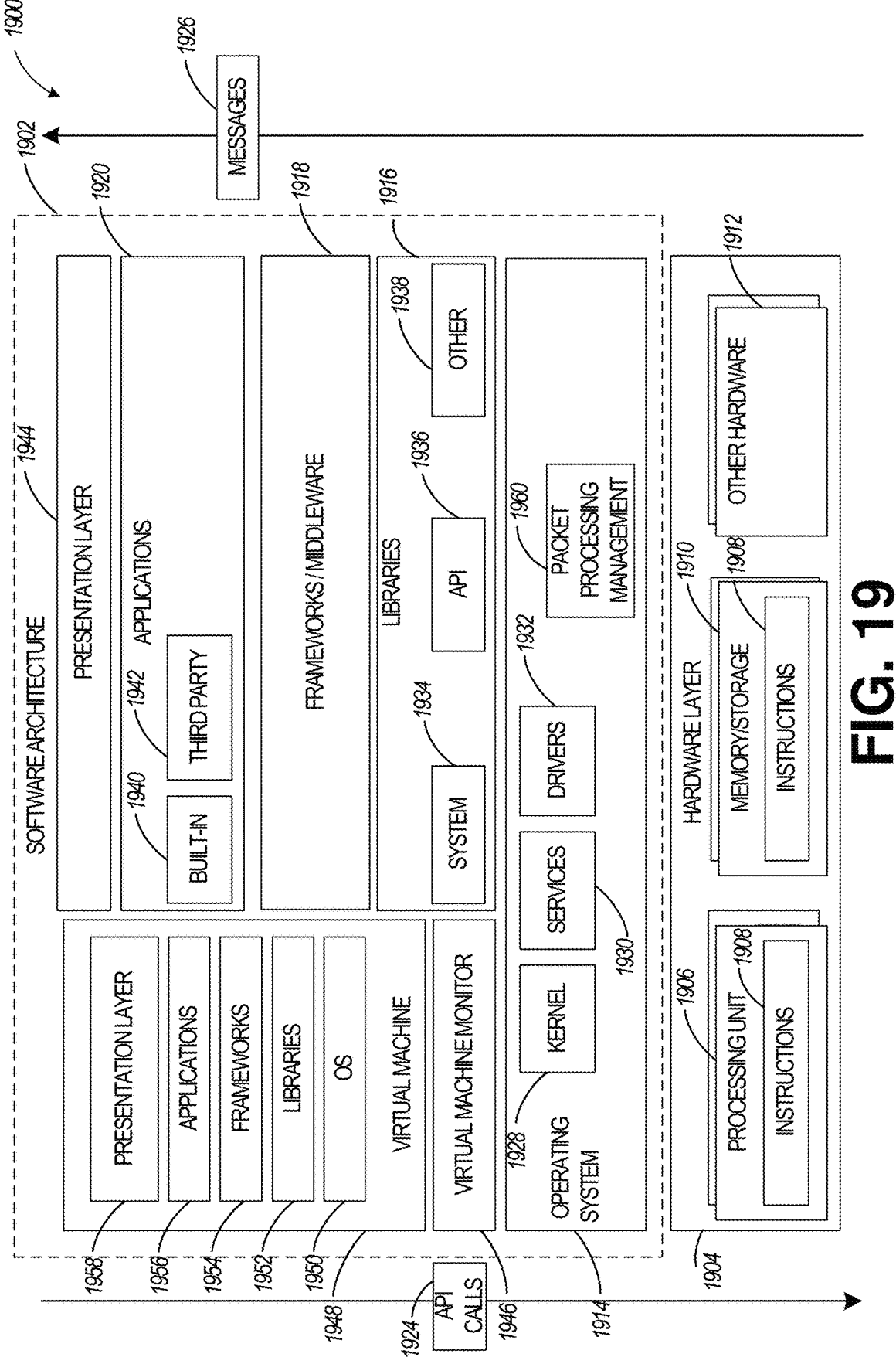
FIG. 19 is a block diagram illustrating a representative software architecture, which may be used in conjunction with various device hardware described herein, according to some example embodiments.

FIG. 19 is a block diagram illustrating a representative software architecture 1900, which may be used in conjunction with various device hardware described herein, according to some example embodiments. FIG. 19 is merely a non-limiting example of a software architecture 1902 and it will be appreciated that many other architectures may be implemented to facilitate the functionality described herein. The software architecture 1902 may be executed on hardware such as computing device 2000 of FIG. 20 that includes, among other things, processor 2005, memory 2010, storage 2015 and 2020, and I/O components (or interfaces) 2025 and 2030. A representative hardware layer 1904 is illustrated and can represent, for example, the computing device 2000 of FIG. 20. The representative hardware layer 1904 comprises one or more processing units 1906 having associated executable instructions 1908. Executable instructions 1908 represent the executable instructions of the software architecture 1902, including implementation of the methods, modules, and so forth of FIGS. 1-18. Hardware layer 1904 also includes memory and/or storage modules 1910, which also have executable instructions 1908. Hardware layer 1904 may also comprise other hardware 1912, which represents any other hardware of the hardware layer 1904, such as the other hardware illustrated as part of computing device 2000.

In the example architecture of FIG. 19, the software architecture 1902 may be conceptualized as a stack of layers where each layer provides particular functionality. For example, the software architecture 1902 may include layers such as an operating system 1914, libraries 1916, frameworks/middleware 1918, applications 1920, and presentation layer 1944. Operationally, the applications 1920 and/or other components within the layers may invoke application programming interface (API) calls 1924 through the software stack and receive a response, returned values, and so forth illustrated as messages 1926 in response to the API calls 1924. The layers illustrated in FIG. 19 are representative in nature and not all software architectures 1902 have all layers. For example, some mobile or special purpose operating systems may not provide frameworks/middleware 1918, while others may provide such a layer. Other software architectures may include additional or different layers.

The operating system 1914 may manage hardware resources and provide common services. The operating system 1914 may include, for example, a kernel 1928, services 1930, drivers 1932, and a PPM module 1960. The kernel 1928 may act as an abstraction layer between the hardware and the other software layers. For example, kernel 1928 may be responsible for memory management, processor management (e.g., scheduling), component management, networking, security settings, and so on. The services 1930 may provide other common services for the other software layers. The drivers 1932 may be responsible for controlling or interfacing with the underlying hardware. For instance, the drivers 1932 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth, depending on the hardware configuration.

In some aspects, the PPM module 1960 can be the same as (and perform the same functionalities as) the PPM module 144 discussed in connection with FIG. 1-FIG. 18.

The libraries 1916 may provide a common infrastructure that may be utilized by the applications 1920 and/or other components and/or layers. The libraries 1916 typically provide functionality that allows other software modules to perform tasks more easily than to interface directly with the underlying operating system 1914 functionality (e.g., kernel 1928, services 1930, drivers 1932, and/or module 1960). The libraries 1916 may include system libraries 1934 (e.g., C standard library) that may provide functions such as memory allocation functions, string manipulation functions, mathematic functions, and the like. In addition, the libraries 1916 may include API libraries 1936 such as media libraries (e.g., libraries to support presentation and manipulation of various media formats such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 1916 may also include a wide variety of other libraries 1938 to provide many other APIs to the applications 1920 and other software components/modules.

The frameworks/middleware 1918 (also sometimes referred to as middleware) may provide a higher-level common infrastructure that may be utilized by the applications 1920 and/or other software components/modules. For example, the frameworks/middleware 1918 may provide various graphical user interface (GUI) functions, high-level resource management, high-level location services, and so forth. The frameworks/middleware 1918 may provide a broad spectrum of other APIs that may be utilized by the applications 1920 and/or other software components/modules, some of which may be specific to a particular operating system 1914 or platform.

The applications 1920 include built-in applications 1940 and/or third-party applications 1942. Examples of representative built-in applications 1940 may include but are not limited to, a contacts application, a browser application, a book reader application, a location application, a media application, a messaging application, and/or a game application. Third-party applications 1942 may include any of the built-in applications 1940 as well as a broad assortment of other applications. In a specific example, the third-party application 1942 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third-party application 1942 may invoke the API calls 1924 provided by the mobile operating system such as operating system 1914 to facilitate functionality described herein.

The applications 1920 may utilize built-in operating system functions (e.g., kernel 1928, services 1930, drivers 1932, and/or modules 1960-1964), libraries (e.g., system libraries 1934, API libraries 1936, and other libraries 1938), and frameworks/middleware 1918 to create user interfaces to interact with users of the system. Alternatively, or additionally, in some systems, interactions with a user may occur through a presentation layer, such as presentation layer 1944. In these systems, the application/module "logic" can be separated from the aspects of the application/module that interact with a user.

Some software architectures utilize virtual machines. In the example of FIG. 19, this is illustrated by virtual machine 1948. A virtual machine creates a software environment where applications/modules can execute as if they were executing on a hardware machine (such as the computing device 2000 of FIG. 20, for example). A virtual machine 1948 is hosted by a host operating system (operating system 1914 in FIG. 19) and typically, although not always, has a virtual machine monitor 1946, which manages the operation of the virtual machine 1948 as well as the interface with the host operating system (i.e., operating system 1914). A software architecture 1902 executes within the virtual machine 1948 such as an operating system 1950, libraries 1952, frameworks/middleware 1954, applications 1956, and/or presentation layer 1958. These layers of software architecture executing within the virtual machine 1948 can be the same as the corresponding layers previously described or may be different.

Figure 20:
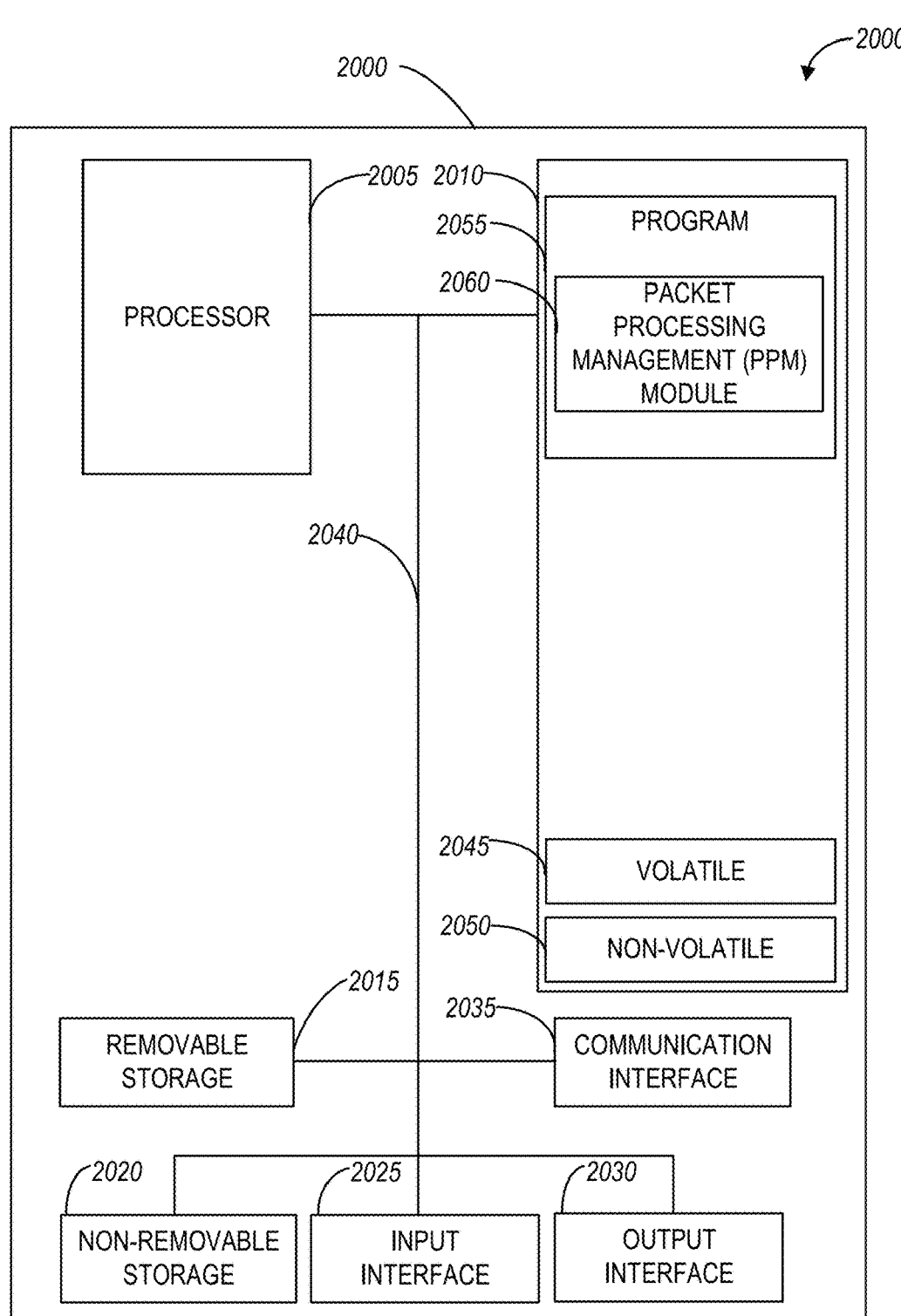
FIG. 20 is a block diagram illustrating circuitry for a device that implements algorithms and performs methods, according to some example embodiments.

FIG. 20 is a block diagram illustrating circuitry for a device that implements algorithms and performs methods, according to some example embodiments. All components need not be used in various embodiments. For example, clients, servers, and cloud-based network devices may each use a different set of components, or in the case of servers, larger storage devices.

One example computing device in the form of a computer 2000 (also referred to as computing device 2000, computer system 2000, or computer 2000) may include a processor 2005, memory 2010, removable storage 2015, non-removable storage 2020, input interface 2025, output interface 2030, and communication interface 2035, all connected by a bus 2040. Although the example computing device is illustrated and described as the computer 2000, the computing device may be in different forms in different embodiments.

The memory 2010 may include volatile memory 2045 and non-volatile memory 2050 and may store a program 2055. The computer 2000 may include—or have access to a computing environment that includes—a variety of computer-readable media, such as the volatile memory 2045, the non-volatile memory 2050, the removable storage 2015, and the non-removable storage 2020. Computer storage includes random-access memory (RAM), read-only memory (ROM), erasable programmable read-only memory (EPROM) and electrically erasable programmable read-only memory (EE-PROM), flash memory or other memory technologies, compact disk read-only memory (CD ROM), digital versatile disks (DVD) or other optical disk storage, magnetic cassettes, magnetic tape, magnetic disk storage or other magnetic storage devices, or any other medium capable of storing computer-readable instructions.

Computer-readable instructions stored on a computer-readable medium (e.g., the program 2055 stored in the memory 2010) are executable by the processor 2005 of the computer 2000. A hard drive, CD-ROM, and RAM are some examples of articles including a non-transitory computer-readable medium such as a storage device. The terms "computer-readable medium" and "storage device" do not include carrier waves to the extent that carrier waves are deemed too transitory. "Computer-readable non-transitory media" includes all types of computer-readable media, including magnetic storage media, optical storage media, flash media, and solid-state storage media. It should be understood that software can be installed on and sold with a computer. Alternatively, the software can be obtained and loaded into the computer, including obtaining the software through a physical medium or distribution system, including, for example, from a server owned by the software creator or from a server not owned but used by the software creator. The software can be stored on a server for distribution over the Internet, for example. As used herein, the terms "computer-readable medium" and "machine-readable medium" are interchangeable.

The program 2055 may utilize modules discussed herein, such as a PPM module 2060 which can be the same as (and perform the same functionalities as) the PPM module 144 discussed in connection with FIG. 1-FIG. 19.

Any one or more of the modules described herein may be implemented using hardware (e.g., a processor of a machine, an application-specific integrated circuit (ASIC), field-programmable gate array (FPGA), or any suitable combination thereof). Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

In some aspects, the disclosed functionalities can be performed by one or more separate (or dedicated) modules included in the PPM module 2060 and integrated as a single module, performing the corresponding functions of the integrated module.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

It should be further understood that software including one or more computer-executable instructions that facilitate processing and operations as described above concerning any one or all of the steps of the disclosure can be installed in and sold with one or more computing devices consistent with the disclosure. Alternatively, the software can be obtained and loaded into one or more computing devices, including obtaining software through a physical medium or distribution system, including, for example, from a server owned by the software creator or from a server not owned but used by the software creator. The software can be stored on a server for distribution over the Internet, for example.

Also, it will be understood by one skilled in the art that this disclosure is not limited in its application to the details of construction and the arrangement of components outlined in the description or illustrated in the drawings. The embodiments herein are capable of other embodiments and capable of being practiced or carried out in various ways. Also, it will be understood that the phraseology and terminology used herein are for description purposes and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings. Further, terms such as up, down, bottom, and top are relative and are employed to aid illustration but are not limiting.

The components of the illustrative devices, systems, and methods employed in accordance with the illustrated embodiments can be implemented, at least in part, in digital electronic circuitry, analog electronic circuitry, or computer hardware, firmware, software, or combinations of them. These components can be implemented, for example, as a computer program product such as a computer program, program code, or computer instructions tangibly embodied in an information carrier, or a machine-readable storage device, for execution by, or to control the operation of, data processing apparatus such as a programmable processor, a computer, or multiple computers.

A computer program can be written in any form of programming language, including compiled or interpreted languages, and it can be deployed in any form, including as a stand-alone program or as a module, component, subroutine, or another unit suitable for use in a computing environment. A computer program can be deployed to be executed on one computer or multiple computers at one site or distributed across multiple sites and interconnected by a communication network. Also, functional programs, codes, and code segments for accomplishing the techniques described herein can be easily construed as within the scope of the claims by programmers skilled in the art to which the techniques described herein pertain. Method steps associated with the illustrative embodiments can be performed by one or more programmable processors executing a computer program, code, or instructions to perform functions (e.g., by operating on input data and/or generating an output). Method steps can also be performed, and apparatus for performing the methods can be implemented as, special purpose logic circuitry, e.g., an FPGA (field programmable gate array) or an ASIC (application-specific integrated circuit), for example.

The various illustrative logical blocks, modules, and circuits described in connection with the embodiments disclosed herein may be implemented or performed with a general-purpose processor, a digital signal processor (DSP), an ASIC, an FPGA, or other programmable logic devices, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Processors suitable for the execution of a computer program include, by way of example, both general and special purpose microprocessors, and any one or more processors of any kind of digital computer. Generally, a processor will receive instructions and data from a read-only memory or a random-access memory or both. The required elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example, semiconductor memory devices, e.g., electrically programmable read-only memory or ROM (EPROM), electrically erasable programmable ROM (EEPROM), flash memory devices, and data storage disks (e.g., magnetic disks, internal hard disks, or removable disks, magneto-optical disks, and CD-ROM and DVD-ROM disks). The processor and the memory can be supplemented by, or incorporated into special purpose logic circuitry.

Those of skill in the art understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

As used herein, "machine-readable medium" (or "computer-readable medium") means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store processor instructions. The term "machine-readable medium" shall also be taken to include any medium (or a combination of multiple media) that is capable of storing instructions for execution by one or more processors 2005, such that the instructions, when executed by one or more processors 2005, cause the one or more processors 2005 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" as used herein excludes signals per se.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the scope disclosed herein.

Described implementations of the subject matter can include one or more features, alone or in combination as illustrated below by way of examples.

Example 1 is a method for video data communication in a network, the method comprising: receiving, by a node in the network, an Internet protocol (IP) data packet, the IP data packet having an IP network layer header and an IP network layer payload; parsing the IP network layer payload, by the node, to detect a Network Abstraction Layer Unit (NALU), the NALU comprising a NALU header and a NALU payload; detecting, by the node, priority information in the NALU header, the priority information indicating a transport priority of the NALU; updating, by the node, a differentiated services (DS) field in the IP network layer header based on the transport priority to generate an updated IP data packet; and forwarding, by the node, the updated IP data packet to a second node in the network for processing based on the updated DS field.

In Example 2, the subject matter of Example 1 includes, mapping the priority information to a differentiated services code point (DSCP) value using a mapping table.

In Example 3, the subject matter of Example 2 includes, updating the DS field in the IP network layer header using the DSCP value.

In Example 4, the subject matter of Examples 1-3 includes, decoding a second IP data packet received by the node, the second IP data packet comprising a data packet.

In Example 5, the subject matter of Example 4 includes, parsing the data packet to determine a contract clause, the contract clause comprising a metadata field storing metadata information.

In Example 6, the subject matter of Example 5 includes, determining transport priority associated with the data packet based on the metadata information.

In Example 7, the subject matter of Example 6 includes, performing one of discarding the IP data packet or forwarding the IP data packet and the data packet to another node in the network based on the transport priority.

In Example 8, the subject matter of Examples 1-7 includes, decoding a second IP data packet, the second IP data packet having a second IP network layer header and a second IP network layer payload; parsing the second IP data packet to detect the second IP network layer header comprises an extension header; parsing the extension header to detect second priority information associated with the second IP data packet; and performing one of discarding the second IP data packet or forwarding the second IP data packet to the second node in the network based on the second priority information.

In Example 9, the subject matter of Examples 1-8 includes, decoding a second IP data packet, the second IP data packet having a second IP network layer header and a second IP network layer payload; parsing the second IP data packet to detect the second IP network layer header comprises an IPV4 header; parsing the IPv4 header to detect second priority information stored in an options field, the second priority information associated with the second IP data packet; and performing one of discarding the second IP data packet or forwarding the second IP data packet to the second node in the network based on the second priority information.

In Example 10, the subject matter of Examples 1-9 includes, parsing the IP data packet to detect a network instruction; determining the network instruction is an instruction for header inspection; and inspecting the NALU header to detect the priority information, the inspecting based on the instruction for the header inspection.

Example 11 is a node for communicating data in a network, the node comprising: a memory storing instructions; and at least one processor in communication with the memory, the at least one processor configured, upon execution of the instructions, to perform operations comprising: receiving an Internet protocol (IP) data packet, the IP data packet having an IP network layer header and an IP network layer payload; parsing the IP network layer payload to detect a Network Abstraction Layer Unit (NALU), the NALU comprising a NALU header and a NALU payload; detecting priority information in the NALU header, the priority information indicating a transport priority of the NALU; updating a differentiated services (DS) field in the IP network layer header based on the transport priority to generate an updated IP data packet; and forwarding the updated IP data packet to a second node in the network for discarding or processing based on the updated DS field.

In Example 12, the subject matter of Example 11 includes, the operations further comprising: mapping the priority information to a differentiated services code point (DSCP) value using a mapping table.

In Example 13, the subject matter of Example 12 includes, the operations further comprising: updating the DS field in the IP network layer header using the DSCP value.

In Example 14, the subject matter of Examples 11-13 includes, the operations further comprising: decoding a second IP data packet received by the node, the second IP data packet comprising a data packet.

In Example 15, the subject matter of Example 14 includes, the operations further comprising: parsing the data packet to determine a contract clause, the contract clause comprising a metadata field storing metadata information.

In Example 16, the subject matter of Example 15 includes, the operations further comprising: determining transport priority associated with the data packet based on the metadata information.

In Example 17, the subject matter of Example 16 includes, the operations further comprising: performing one of discarding the IP data packet or forwarding the IP data packet and the data packet to another node in the network based on the transport priority.

In Example 18, the subject matter of Examples 11-17 includes, the operations further comprising: decoding a second IP data packet, the second IP data packet having a second IP network layer header and a second IP network layer payload; parsing the second IP data packet to detect the second IP network layer header comprises an extension header; parsing the extension header to detect second priority information associated with the second IP data packet;

and performing one of discarding the second IP data packet or forwarding the second IP data packet to the second node in the network based on the second priority information.

In Example 19, the subject matter of Examples 11-18 includes, the operations further comprising: decoding a second IP data packet, the second IP data packet having a second IP network layer header and a second IP network layer payload; parsing the second IP data packet to detect the second IP network layer header comprises an IPv4 header; parsing the IPv4 header to detect second priority information stored in an options field, the second priority information associated with the second IP data packet; and performing one of discarding the second IP data packet or forwarding the second IP data packet to the second node in the network based on the second priority information.

In Example 20, the subject matter of Examples 11-19 includes, the operations further comprising: parsing the IP data packet to detect a network instruction; determining the network instruction is an instruction for header inspection; and inspecting the NALU header to detect the priority information, the inspecting based on the instruction for the header inspection.

Example 21 is a non-transitory computer-readable medium storing computer instructions for communicating data in a network, wherein the instructions when executed by one or more processors of a node, cause the one or more processors to perform operations comprising: receiving an Internet protocol (IP) data packet, the IP data packet having an IP network layer header and an IP network layer payload; parsing the IP network layer payload to detect a Network Abstraction Layer Unit (NALU), the NALU comprising a NALU header and a NALU payload; detecting priority information in the NALU header, the priority information indicating a transport priority of the NALU; updating a differentiated services (DS) field in the IP network layer header based on the transport priority to generate an updated IP data packet; and forwarding the updated IP data packet to a second node in the network for discarding or processing based on the updated DS field.

In Example 22, the subject matter of Example 21 includes, the operations further comprising: mapping the priority information to a differentiated services code point (DSCP) value using a mapping table.

In Example 23, the subject matter of Example 22 includes, the operations further comprising: updating the DS field in the IP network layer header using the DSCP value.

In Example 24, the subject matter of Examples 21-23 includes, the operations further comprising: decoding a second IP data packet received by the node, the second IP data packet comprising a data packet.

In Example 25, the subject matter of Example 24 includes, the operations further comprising: parsing the data packet to determine a contract clause, the contract clause comprising a metadata field storing metadata information.

In Example 26, the subject matter of Example 25 includes, the operations further comprising: determining transport priority associated with the data packet based on the metadata information.

In Example 27, the subject matter of Example 26 includes, the operations further comprising: performing one of discarding the IP data packet or forwarding the IP data packet and the data packet to another node in the network based on the transport priority.

In Example 28, the subject matter of Examples 21-27 includes, the operations further comprising: decoding a second IP data packet, the second IP data packet having a second IP network layer header and a second IP network layer payload; parsing the second IP data packet to detect the second IP network layer header comprises an extension header; parsing the extension header to detect second priority information associated with the second IP data packet; and performing one of discarding the second IP data packet or forwarding the second IP data packet to the second node in the network based on the second priority information.

In Example 29, the subject matter of Examples 21-28 includes, the operations further comprising: decoding a second IP data packet, the second IP data packet having a second IP network layer header and a second IP network layer payload; parsing the second IP data packet to detect the second IP network layer header comprises an IPV4 header; parsing the IPv4 header to detect second priority information stored in an options field, the second priority information associated with the second IP data packet; and performing one of discarding the second IP data packet or forwarding the second IP data packet to the second node in the network based on the second priority information.

In Example 30, the subject matter of Examples 21-29 includes, the operations further comprising: parsing the IP data packet to detect a network instruction; determining the network instruction is an instruction for header inspection; and inspecting the NALU header to detect the priority information, the inspecting based on the instruction for the header inspection.

Example 31 is a method for video data communication in a network, the method comprising: receiving, by a node in the network, a New Internet protocol (IP) data packet and an IP data packet; parsing the IP data packet, by the node, to detect a Network Abstraction Layer Unit (NALU), the NALU comprising a NALU header and a NALU payload; parsing the data packet, by the node, to obtain priority information, the priority information indicating a transport priority of the NALU; and processing, by the node, the NALU based on the transport priority.

In Example 32, the subject matter of Example 31 includes, parsing the data packet to determine a contract clause, the contract clause comprising a metadata field storing metadata information.

In Example 33, the subject matter of Example 32 includes, determining the transport priority of the data packet based on the metadata information.

In Example 34, the subject matter of Example 33 includes, wherein the processing further comprises: performing one of discarding the NALU or forwarding the data packet and the IP data packet to another node in the network based on the transport priority.

Example 35 is a device configured to perform the steps of any of Examples 31-34.

Example 36 is a non-transitory computer-readable medium storing computer instructions, wherein the instructions when executed by one or more processors of a node, cause the one or more processors to perform the steps of any of Examples 31-34.

Example 37 is a method for video data communication in a network, the method comprising: receiving, by a non-media aware network element (non-MANE) enabled node in the network, a first data packet and a second data packet; parsing the first data packet, by the non-MANE enabled node, to obtain a network instruction; determining, by the non-MANE enabled node, the network instruction is an instruction for forwarding to a MANE enabled router; and forwarding, by the non-MANE enabled node, the second data packet and the first data packet to the MANE enabled router.

In Example 38, the subject matter of Example 37 includes, wherein the first data packet comprises a contract clause, the contract clause storing the network instruction.

In Example 39, the subject matter of Example 38 includes, wherein the contract clause further comprises metadata information, the metadata information comprising security context information to authenticate the MANE enabled router to access a Network Abstraction Layer Unit (NALU) header in the second data packet.

In Example 40, the subject matter of Examples 37-39 includes, wherein the first data packet is a New Internet Protocol (IP) data packet and the second data packet is an IP data packet.

Example 41 is a device configured to perform the steps of any of Examples 37-40.

Example 42 is a non-transitory computer-readable medium storing computer instructions, wherein the instructions when executed by one or more processors of a node, cause the one or more processors to perform the steps of any of Examples 37-40.

Example 43 is a method for video data communication in a network, the method comprising: receiving, by a non-media aware network element (non-MANE) enabled node in the network, an Internet protocol (IP) data packet, the IP data packet having an IP network layer header and an IP network layer payload; parsing, by the non-MANE enabled node, the IP data packet to detect the IP network layer header comprises an extension header; parsing, by the non-MANE enabled node, the extension header to detect priority information associated with the IP data packet; and processing, by the non-MANE enabled node, the IP data packet based on the priority information.

In Example 44, the subject matter of Example 43 includes, wherein the processing further comprises: performing one of discarding the IP data packet or forwarding the IP data packet to another node in the network based on the priority information.

In Example 45, the subject matter of Examples 43-44 includes, wherein the IP network layer payload includes a Network Abstraction Layer Unit (NALU), the NALU comprising a NALU header and a NALU payload.

Example 46 is a device configured to perform the steps of any of Examples 43-45.

Example 47 is a non-transitory computer-readable medium storing computer instructions, wherein the instructions when executed by one or more processors of a node, cause the one or more processors to perform the steps of any of Examples 43-45.

Example 48 is a method for video data communication in a network, the method comprising: receiving, by a non-media aware network element (non-MANE) enabled node in the network, an Internet protocol (IP) data packet, the IP data packet having an IP network layer header and an IP network layer payload; parsing, by the non-MANE enabled node, the IP data packet to detect the IP network layer header comprises an IP version 4 (IPv4) header; parsing, by the non-MANE enabled node, the IPV4 header to detect priority information associated with the IP data packet; and processing, by the non-MANE enabled node, the IP data packet based on the priority information.

In Example 49, the subject matter of Example 48 includes, wherein the processing further comprises: performing one of discarding the IP data packet or forwarding the IP data packet to another node in the network based on the priority information.

Example 50 is a device configured to perform the steps of any of Examples 48-49.

Example 51 is a non-transitory computer-readable medium storing computer instructions, wherein the instructions when executed by one or more processors of a node, cause the one or more processors to perform the steps of any of Examples 48-49.

Example 52 is at least one machine-readable medium including instructions that, when executed by processing circuitry, cause the processing circuitry to perform operations to implement any of Examples 1-51.

Example 53 is an apparatus comprising means to implement any of Examples 1-51

Example 54 is a system to implement any of Examples 1-51.

Example 55 is a method to implement any of Examples 1-51.

Although the present disclosure has been described concerning specific features and embodiments thereof, it is evident that various modifications and combinations can be made thereto without departing from the scope of the disclosure. For example, other components may be added to, or removed from, the described systems. The specification and drawings are, accordingly, to be regarded simply as an illustration of the disclosure as defined by the appended claims, and are contemplated to cover any modifications, variations, combinations, or equivalents that fall within the scope of the present disclosure. Other aspects may be within the scope of the following claims.

What is claimed is:

1. A method for video data communication in a network, the method comprising:
   receiving, by a node in the network, an Internet protocol (IP) data packet, the IP data packet having an IP network layer header and an IP network layer payload;
   parsing the IP network layer payload, by the node, to detect a Network Abstraction Layer Unit (NALU), the NALU comprising a NALU header and a NALU payload;
   detecting, by the node, priority information in the NALU header, the priority information indicating a transport priority of the NALU;
   updating, by the node, a differentiated services (DS) field in the IP network layer header based on the transport priority to generate an updated IP data packet; and
   forwarding, by the node, the updated IP data packet to a second node in the network for processing based on the updated DS field.

2. The method of claim 1, further comprising:
   mapping the priority information to a differentiated services code point (DSCP) value using a mapping table.

3. The method of claim 2, further comprising:
   updating the DS field in the IP network layer header using the DSCP value.

4. The method of claim 1, further comprising:
   decoding a second IP data packet received by the node, the second IP data packet comprising a data packet.

5. The method of claim 4, further comprising:
   parsing the data packet to determine a contract clause, the contract clause comprising a metadata field storing metadata information.

6. The method of claim 5, further comprising:
   determining transport priority associated with the data packet based on the metadata information.

7. The method of claim 6, further comprising:
   performing one of discarding the IP data packet or forwarding the IP data packet and the data packet to another node in the network based on the transport priority.

8. A node for communicating data in a network, the node comprising:

a memory storing instructions; and at least one processor in communication with the memory, the at least one processor configured, upon execution of the instructions, to perform operations comprising:

receiving an Internet protocol (IP) data packet, the IP data packet having an IP network layer header and an IP network layer payload;

parsing the IP network layer payload to detect a Network Abstraction Layer Unit (NALU), the NALU comprising a NALU header and a NALU payload;

detecting priority information in the NALU header, the priority information indicating a transport priority of the NALU;

updating a differentiated services (DS) field in the IP network layer header based on the transport priority to generate an updated IP data packet; and forwarding the updated IP data packet to a second node in the network for discarding or processing based on the updated DS field.

9. The node of claim 8, the operations further comprising:

mapping the priority information to a differentiated services code point (DSCP) value using a mapping table.

10. The node of claim 9, the operations further comprising:

updating the DS field in the IP network layer header using the DSCP value.

11. The node of claim 8, the operations further comprising:

decoding a second IP data packet received by the node, the second IP data packet comprising a data packet.

12. The node of claim 11, the operations further comprising:

parsing the data packet to determine a contract clause, the contract clause comprising a metadata field storing metadata information.

13. The node of claim 12, the operations further comprising:

determining transport priority associated with the data packet based on the metadata information.

14. The node of claim 13, the operations further comprising:

performing one of discarding the IP data packet or forwarding the IP data packet and the data packet to another node in the network based on the transport priority.

15. A non-transitory computer-readable medium storing computer instructions for communicating data in a network, wherein the instructions when executed by one or more processors of a node, cause the one or more processors to perform operations comprising:

receiving an Internet protocol (IP) data packet, the IP data packet having an IP network layer header and an IP network layer payload;

parsing the IP network layer payload to detect a Network Abstraction Layer Unit (NALU), the NALU comprising a NALU header and a NALU payload;

detecting priority information in the NALU header, the priority information indicating a transport priority of the NALU;

updating a differentiated services (DS) field in the IP network layer header based on the transport priority to generate an updated IP data packet; and forwarding the updated IP data packet to a second node in the network for discarding or processing based on the updated DS field.

16. The non-transitory computer-readable medium of claim 15, the operations further comprising:

mapping the priority information to a differentiated services code point (DSCP) value using a mapping table.

17. The non-transitory computer-readable medium of claim 16, the operations further comprising:

updating the DS field in the IP network layer header using the DSCP value.

18. The non-transitory computer-readable medium of claim 15, the operations further comprising:

decoding a second IP data packet received by the node, the second IP data packet comprising a data packet.

19. The non-transitory computer-readable medium of claim 18, the operations further comprising:

parsing the data packet to determine a contract clause, the contract clause comprising a metadata field storing metadata information.

20. The non-transitory computer-readable medium of claim 19, the operations further comprising:

determining transport priority associated with the data packet based on the metadata information.

\* \* \* \* \*